US012700301B2

(12) United States Patent

Ramamoorthy et al.

(10) Patent No.: US 12,700,301 B2

(45) Date of Patent: Aug. 4, 2026

(54) AUTONOMOUS VEHICLE PLANNING AND PREDICTION

(71) Applicant: Five AI Limited, Cambridge (GB)

(72) Inventors: Subramanian Ramamoorthy, Edinburgh (GB); Simon Lyons, Edinburgh (GB); Svetlin Valentinov Penkov, Edinburgh (GB); Morris Antonello, Edinburgh (GB)

(73) Assignee: Five AI Limited, Cambridge (GB)

( * ) Notice: Subject to any disclaimer, the term of this patent is extended or adjusted under 35 U.S.C. 154(b) by 0 days.

(21) Appl. No.: 18/756,819

(22) Filed: Jun. 27, 2024

(65) Prior Publication Data

US 2024/0428682 A1 Dec. 26, 2024

Related U.S. Application Data

(63) Continuation of application No. 17/285,294, filed as application No. PCT/EP2019/078062 on Oct. 16, 2019, now Pat. No. 12,046,131.

(30) Foreign Application Priority Data

| Oct. 16, 2018 | (GB) | 1816850 |
| Oct. 16, 2018 | (GB) | 1816852 |
| Oct. 16, 2018 | (GB) | 1816853 |

(51) Int. Cl.
  *B60W 60/00* (2020.01)
  *B60W 40/04* (2006.01)
  (Continued)

(52) U.S. Cl.
  CPC .......... *G08G 1/0116* (2013.01); *B60W 40/04* (2013.01); *B60W 50/0097* (2013.01);
  (Continued)

(58) Field of Classification Search
  CPC ....... B60W 60/0027; B60W 60/00272; B60W 60/00274; B60W 60/00276; B60W 30/0956; G05D 1/0212
  See application file for complete search history.

(56) References Cited

U.S. PATENT DOCUMENTS

| 9,187,088 B1 | 11/2015 | Ferguson et al. |
| 9,914,452 B1 | 3/2018 | Ferguson et al. |
| (Continued) | | |

FOREIGN PATENT DOCUMENTS

| JP | 2005346371 A | 12/2005 |
| JP | 2008210051 A | 9/2008 |
| (Continued) | | |

OTHER PUBLICATIONS

International Search Report and Written Opinion for International Application No. PCT/EP2019/078072 mailed May 13, 2020.

(Continued)

*Primary Examiner* — Kenneth J Malkowski
(74) *Attorney, Agent, or Firm* — Andrew J. Tibbetts; Samuel S. Stone; Greenberg Traurig, LLP

(57) ABSTRACT

A computer-implemented method of predicting an external actor trajectory comprises receiving, at a computer, sensor inputs for detecting and tracking an external actor; applying object tracking to the sensor inputs, in order track the external actor, and thereby determine an observed trace of the external actor over a time interval; determining a set of available goals for the external actor; for each of the available goals, determining an expected trajectory model; and comparing the observed trace of the external actor with the expected trajectory model for each of the available goals, to determine a likelihood of that goal.

15 Claims, 5 Drawing Sheets

(51) Int. Cl.

| | | |
|---|---|---|
| *B60W 50/00* | (2006.01) | |
| *G05B 13/02* | (2006.01) | |
| *G05B 13/04* | (2006.01) | |
| *G06F 18/20* | (2023.01) | |
| *G06F 18/214* | (2023.01) | |
| *G06F 18/24* | (2023.01) | |
| *G06N 3/045* | (2023.01) | |
| *G06T 7/20* | (2017.01) | |
| *G06V 10/84* | (2022.01) | |
| *G06V 20/54* | (2022.01) | |
| *G06V 20/56* | (2022.01) | |
| *G08G 1/01* | (2006.01) | |
| *H04N 7/18* | (2006.01) | |

(52) U.S. Cl.
CPC .... *B60W 60/0013* (2020.02); *B60W 60/0015* (2020.02); *B60W 60/0027* (2020.02); *G05B 13/027* (2013.01); *G05B 13/04* (2013.01); *G06F 18/214* (2023.01); *G06F 18/24* (2023.01); *G06F 18/295* (2023.01); *G06N 3/045* (2023.01); *G06T 7/20* (2013.01); *G06V 10/84* (2022.01); *G06V 20/54* (2022.01); *G06V 20/56* (2022.01); *G08G 1/0129* (2013.01); *H04N 7/183* (2013.01); *B60W 2540/30* (2013.01); *B60W 2554/4046* (2020.02); *G06T 2207/20081* (2013.01); *G06T 2207/20084* (2013.01); *G06T 2207/30236* (2013.01); *G06T 2207/30241* (2013.01)

(56) References Cited

U.S. PATENT DOCUMENTS

| | | | |
|---|---|---|---|
| 10,275,664 | B2 | 4/2019 | Mullen |
| 10,935,979 | B1 * | 3/2021 | Ross .............. B60W 60/00274 |
| 11,015,948 | B2 | 5/2021 | Okamoto et al. |
| 11,112,795 | B1 | 9/2021 | Mandi et al. |
| 11,237,554 | B2 | 2/2022 | Rezaeian et al. |
| 11,250,895 | B1 | 2/2022 | Sheth et al. |
| 12,046,131 | B2 | 7/2024 | Ramamoorthy et al. |
| 2014/0336913 | A1 | 11/2014 | Fino |
| 2015/0014995 | A1 | 1/2015 | Nishioka |
| 2017/0088038 | A1 | 3/2017 | Geller |
| 2018/0089563 | A1 | 3/2018 | Redding et al. |
| 2018/0090001 | A1 | 3/2018 | Fletcher |
| 2019/0310627 | A1 | 10/2019 | Halder |
| 2019/0310650 | A1 | 10/2019 | Halder |

FOREIGN PATENT DOCUMENTS

| | | | |
|---|---|---|---|
| JP | 2016004478 | A1 | 1/2016 |
| JP | 2016051465 | A | 4/2016 |
| JP | 2016070805 | A | 5/2016 |
| JP | 2018055141 | A | 4/2018 |
| WO | WO 2017/138664 | A1 | 8/2017 |
| WO | 2018131322 | A2 | 7/2018 |
| WO | WO 2018/162521 | A1 | 9/2018 |

OTHER PUBLICATIONS

Ajanovic et al., Search-based optimal motion planning for automated driving. arXiv preprint arXiv:1803.04868. Aug. 3, 2018:8 pages.

Albrecht et al., Autonomous agents modelling other agents: A comprehensive survey and open problems. Artificial Intelligence. May 1, 2018;258:66-95.

Albrecht et al., Belief and truth in hypothesised behaviours. Artificial Intelligence. Jun. 1, 2016;235:63-94.

Albrecht et al., Interpretable Goal-based Prediction and Planning for Autonomous Driving. arXiv:2002.02277v3. Mar. 15, 2021:7 pages.

Andersen et al., Trajectory optimization for autonomous overtaking with visibility maximization. 2017 IEEE 20th International Conference on Intelligent Transportation Systems (ITSC) Oct. 16, 2017:8 pages.

Auer et al., Finite-time analysis of the multiarmed bandit problem. Machine learning. May 2002;47(2):235-56.

Badue et al., Self-Driving Cars: A Survey. arXiv preprint arXiv:1901.04407. Jan. 14, 2019:34 pages.

Bahram et al., A game-theoretic approach to replanning-aware interactive scene prediction and planning. IEEE Transactions on Vehicular Technology. Dec. 11, 2015;65(6):3981-92.

Baker et al., Action understanding as inverse planning. Cognition. Dec. 1, 2009;113(3):329-49.

Bandyopadhyay et al., Algorithmic foundations of robotics X 2013. Springer:475-91.

Bast et al., Route Planning in Transportation Networks. arXiv preprint arXiv:1504.05140. Apr. 20, 2015;65 pages.

Best et al., AutonoVi: Autonomous Vehicle Planning with Dynamic Maneuvers and Traffic Constraints. arXiv preprint arXiv:1703.08561. Mar. 29, 2017:9 pages.

Brechtel et al., Probabilistic decision-making under uncertainty for autonomous driving using continuous POMDPs. 17th international IEEE conference on intelligent transportation systems (ITSC) Oct. 8, 2014:9 pages.

Browne et al., A survey of monte carlo tree search methods. IEEE Transactions on Computational Intelligence and AI in games. Feb. 3, 2012;4(1):1-43.

Cai et al., Lets-drive: Driving in a crowd by learning from tree search. arXiv preprint arXiv:1905.12197. May 29, 2019:9 pages.

Carvalho et al., Automated driving: The role of forecasts and uncertainty—A control perspective. European Journal of Control preprint. Jul. 1, 2015;24:45 pages.

Chai et al., Multipath: Multiple probabilistic anchor trajectory hypotheses for behavior prediction. arXiv preprint arXiv:1910.05449. Oct. 12, 2019:12 pages.

Chen et al., Model-free Deep Reinforcement Learning for Urban Autonomous Driving. arXiv preprint arXiv:1904.09503. Oct. 21, 2019:7 pages.

Cheung et al., Efficient and safe vehicle navigation based on driver behavior classification. Proceedings of the IEEE Conference on Computer Vision and Pattern Recognition Workshops 2018:1037-44.

Chou et al., Learning constraints from demonstrations. arXiv preprint arXiv:1812.07084. Feb. 21, 2019:25 pages.

Cunningham et al., MPDM: Multipolicy decision-making in dynamic, uncertain environments for autonomous driving. 2015 IEEE International Conference on Robotics and Automation (ICRA) May 26, 2015:8 pages.

Dong et al., Intention estimation for ramp merging control in autonomous driving. 2017 IEEE intelligent vehicles symposium (IV) Jun. 11, 2017:6 pages.

Dong et al., Smooth behavioral estimation for ramp merging control in autonomous driving. 2018 IEEE Intelligent Vehicles Symposium (IV) Jun. 26, 2018;6 pages.

Düring et al., Cooperative decentralized decision making for conflict resolution among autonomous agents. 2014 IEEE International Symposium on Innovations in Intelligent Systems and Applications (INISTA) Proceedings Jun. 23, 2014:154.

Evestedt et al., Interaction aware trajectory planning for merge scenarios in congested traffic situations. 2016 IEEE 19th International Conference on Intelligent Transportation Systems (ITSC) Nov. 1, 2016:465-72.

Fisac et al., Hierarchical Game-Theoretic Planning for Autonomous Vehicles. arXiv preprint arXiv:1810.05766. Oct. 13, 2018:7 pages.

Galceran et al., Multipolicy Decision-Making for Autonomous Driving via Changepoint-based Behavior Prediction. University of Michigan. 2015:10 pages.

Galceran et al., Multipolicy decision-making for autonomous driving via changepoint-based behavior prediction: Theory and experiment. Autonomous Robots. Aug. 2017;41(6):16 pages.

Gámez Serna et al., Dynamic speed adaptation for path tracking based on curvature information and speed limits. Sensors. Jun. 2017;17(6):1383.

(56) References Cited

OTHER PUBLICATIONS

Gindele et al., Learning driver behavior models from traffic observations for decision making and planning. IEEE Intelligent Transportation Systems Magazine. Jan. 19, 2015;7(1):69-79.

González et al., A review of motion planning techniques for automated vehicles. IEEE Transactions on Intelligent Transportation Systems. Nov. 26, 2015;17(4):13 pages.

Hardy et al., Contingency planning over probabilistic hybrid obstacle predictions for autonomous road vehicles. 2010 IEEE/RSJ International Conference on Intelligent Robots and Systems Oct. 18, 2010:2237-42.

Hart et al., A formal basis for the heuristic determination of minimum cost paths. IEEE transactions on Systems Science and Cybernetics. Jul. 1968;4(2):100-7.

He et al., Efficient planning under uncertainty with macro-actions. Journal of Artificial Intelligence Research. Mar. 1, 2011;40:523-70.

Hoel et al., Automated Speed and Lane Change Decision Making using Deep Reinforcement Learning. arXiv preprint arXiv:1803.10056. Nov. 1, 2018:8 pages.

Hoermann et al., Probabilistic long-term prediction for autonomous vehicles. 2017 IEEE Intelligent Vehicles Symposium (IV) Jun. 11, 2017:7 pages.

Hubmann et al., A belief state planner for interactive merge maneuvers in congested traffic. 2018 21st International Conference on Intelligent Transportation Systems (ITSC) Nov. 4, 2018:1617-24.

Hubmann et al., Automated Driving in Uncertain Environments: Planning with Interaction and Uncertain Maneuver Prediction. IEEE Transactions on Intelligent Vehicles. 2017:14 pages.

Hubmann et al., Decision Making for Autonomous Driving considering Interaction and Uncertain Prediction of Surrounding Vehicles. Jun. 2017:9 pages.

Jain et al., Multi-Fidelity Recursive Behavior Prediction. arXiv preprint arXiv:1901.01831. Dec. 18, 2018:6 pages.

Kocsis et al., Bandit based monte-carlo planning. European conference on machine learning. Springer. Sep. 18, 2006:282-93.

Koschi et al., SPOT: A tool for set-based prediction of traffic participants. 2017 IEEE Intelligent Vehicles Symposium (IV) Jun. 11, 2017:8 pages.

Kurzer et al., Decentralized Cooperative Planning for Automated Vehicles with Continuous Monte Carlo Tree Search. IEEE ITSC. arXiv preprint arXiv:1809.03200. Sep. 10, 2018:8 pages.

Kurzer et al., Decentralized Cooperative Planning for Automated Vehicles with Hierarchical Monte Carlo Tree Search. IEEE IV. arXiv preprint arXiv:1807.09530. Jul. 25, 2018:8 pages.

Kwon et al., When Humans Aren't Optimal: Robots that Collaborate with Risk-Aware Humans. arXiv preprint arXiv:2001.04377. Jan. 13, 2020:10 pages.

Lee et al., Desire: Distant future prediction in dynamic scenes with interacting agents. Proceedings of the IEEE Conference on Computer Vision and Pattern Recognition 2017:336-45.

Lenz et al., Deep neural networks for Markovian interactive scene prediction in highway scenarios. 2017 IEEE Intelligent Vehicles Symposium (IV) Jun. 11, 2017:685-92.

Lenz et al., Tactical cooperative planning for autonomous highway driving using Monte-Carlo Tree Search. 2016 IEEE Intelligent Vehicles Symposium (IV) Jun. 19, 2016:447-53.

Levine et al., Continuous inverse optimal control with locally optimal examples. Proceedings of the 29th International Conference on International Conference on Machine Learning Jun. 26, 2012:8 pages.

Li et al., Game-Theoretic Modeling of Driver and Vehicle Interactions for Verification and Validation of Autonomous Vehicle Control Systems. IEEE TCST. arXiv preprint arXiv:1608.08589. Aug. 30, 2016:13 pages.

Liu et al., Situation-aware decision making for autonomous driving on urban road using online POMDP. 2015 IEEE Intelligent Vehicles Symposium (IV) Jun. 28, 2015:9 pages.

Niekum et al., Online bayesian changepoint detection for articulated motion models. 2015 IEEE International Conference on Robotics and Automation (ICRA) May 26, 2015:8 pages.

Nishi et al., Freeway Merging in Congested Traffic based on Multipolicy Decision Making with Passive Actor Critic. arXiv preprint arXiv:1707.04489. Jul. 14, 2017:6 pages.

Paden et al., A Survey of Motion Planning and Control Techniques for Self-driving Urban Vehicles. arXiv preprint arXiv:1604.07446. Apr. 25, 2016:27 pages.

Paxton et al., Combining Neural Networks and Tree Search for Task and Motion Planning in Challenging Environments. arXiv preprint arXiv:1703.07887. Mar. 22, 2017:8 pages.

Pendleton et al., Perception, planning, control, and coordination for autonomous vehicles. Machines. Mar. 2017;5(1):54 pages.

Ramírez et al., Probabilistic plan recognition using off-the-shelf classical planners. InTwenty-Fourth AAAI Conference on Artificial Intelligence Jul. 4, 2010:1121-26.

Rasouli et al., Autonomous vehicles that interact with pedestrians: A survey of theory and practice. IEEE transactions on intelligent transportation systems. Mar. 15, 2019;21(3):900-18.

Rhinehart et al., Precog: Prediction conditioned on goals in visual multi-agent settings. Proceedings of the IEEE/CVF International Conference on Computer Vision 2019:2821-30.

Rudenko et al., Human Motion Trajectory Prediction: A Survey. arXiv preprint arXiv:1905.06113. May 15, 2019:37 pages.

Sadigh et al., Information Gathering Actions over Human Internal State. UC Berkeley. Nov. 28, 2016:9 pages.

Sadigh et al., Planning for autonomous cars that leverage effects on human actions. Robotics: Science and Systems Jun. 18, 2016:1-9.

Sallab et al., Deep reinforcement learning framework for autonomous driving. Electronic Imaging. Jan. 29, 2017;2017(19):70-6.

Sauer et al., Conditional affordance learning for driving in urban environments. Conference on Robot Learning (CoRL) Oct. 23, 2018:16 pages.

Schulz et al., Interaction-Aware Probabilistic Behavior Prediction in Urban Environments. arXiv preprint arXiv:1804.10467. Aug. 28, 2018:8 pages.

Schwarting et al., Planning and decision-making for autonomous vehicles. Annual Review of Control, Robotics, and Autonomous Systems. May 28, 2018;1:187-210.

Schwarting et al., Recursive conflict resolution for cooperative motion planning in dynamic highway traffic. 17th International IEEE Conference on Intelligent Transportation Systems (ITSC) Oct. 8, 2014:1039-44.

Shalev-Shwartz et al., Safe, multi-agent, reinforcement learning for autonomous driving. arXiv preprint arXiv:1610.03295. Oct. 11, 2016:13 pages.

Somani et al., DESPOT: Online POMDP planning with regularization. Advances in neural information processing systems. 2013;26:9 pages.

Song et al., Intention-aware autonomous driving decision-making in an uncontrolled intersection. Mathematical Problems in Engineering. Mar. 2016;2016:16 pages.

Sonu et al., Exploiting hierarchy for scalable decision making in autonomous driving. 2018 IEEE Intelligent Vehicles Symposium (IV) Jun. 26, 2018:6 pages.

Sutton et al., Reinforcement learning: An introduction. MIT press; Nov. 13, 2018:548 pages.

Talpaert et al., Exploring applications of deep reinforcement learning for real-world autonomous driving systems. arXiv preprint arXiv:1901.01536. Jan. 16, 2019:9 pages.

Treiber et al., Congested Traffic States in Empirical Observations and Microscopic Simulations. arXiv preprint cond-mat/0002177. Aug. 30, 2000:47 pages.

Völz et al., Inferring pedestrian motions at urban crosswalks. IEEE Transactions on Intelligent Transportation Systems. May 11, 2018;20(2):12 pages.

Wächter et al., On the Implementation of an Interior-Point Filter Line-Search Algorithm for Large-Scale Nonlinear Programming. 2004:28 pages.

Watkins et al., Q-learning. Machine learning. vol. Mar. 1992;8:55-68.

Wei et al., Autonomous vehicle social behavior for highway entrance ramp management. 2013 IEEE Intelligent Vehicles Symposium (IV) Jun. 23, 2013:201-7.

(56)                    References Cited

OTHER PUBLICATIONS

Wulfmeier et al., Maximum entropy deep inverse reinforcement learning. arXiv preprint arXiv:1507.04888. Mar. 11, 2016:10 pages.

Wulfmeier et al., Watch This: Scalable Cost-Function Learning for Path Planning in Urban Environments. arXiv preprint arXiv:1607.02329. Jul. 8, 2016:8 pages.

Xu et al., Learning trajectory prediction with continuous inverse optimal control via Langevin sampling of energy-based models. arXiv preprint arXiv:1904.05453. Apr. 10, 2019:9 pages.

Zhou et al., Joint Multi-Policy Behavior Estimation and Receding-Horizon Trajectory Planning for Automated Urban Driving. 2018:7 pages.

Ziebart et al., Maximum entropy inverse reinforcement learning. AAAI Jul. 13, 2008:1433-38.

Translation of Office Action issued in Japanese Patent Application No. 2021-546461, mailed Nov. 8, 2022 (5 pages).

Translation of Office Action issued in Japanese Patent Application No. 2021-546462, mailed Nov. 1, 2022 (8 pages).

Office Action issued in European Patent Application No. 19801204.9, mailed Jun. 16, 2023 (6 pages).

Schulz Jens et al., "Estimation of Collective Maneuvers through Cooperative Multi-Agent Planning," 2017 IEEE Intelligent Vehicles Symposium, Jun. 11, 2017, pp. 624-631.

Translation of Office Action issued in Japanese Patent Application No. 2021-546461, mailed Mar. 24, 2023 (6 pages).

U.S. Appl. No. 17/285,294, filed Apr. 14, 2021, Ramamoorthy, et al.

International Search Report and Written Opinion for International Application No. PCT/EP2019/078062 mailed Feb. 25, 2020.

Byeoungdo et al., Probabilistic vehicle trajectory prediction over occupancy grid map via recurrent neural network. ArXiv preprint ArXiv: 1704.07049v2. Sep. 1, 2017;2:1-6.

Deo et al., How would surround vehicles move? A Unified Framework for Maneuver Classification and Motion Prediction. ArXiv preprint ArXiv: 1801.06523v1. Jan. 19, 2018;1:1-12.

Houenou et al., Vehicle trajectory prediction based on motion model and maneuver recognition. 2013 IEEE/RSJ international conference on intelligent robots and systems (IROS). Nov. 3, 2013:4363-4369.

Schreier et al., Bayesian, maneuver-based, long-term trajectory prediction and criticality assessment for driver assistance systems. 17th International IEEE Conference on Intelligent Transportation Systems (ITSC). Oct. 8, 2014:334-341.

Office Action in Japanese Application No. 2021-546461, mailed Sep. 22, 2023.

Korean Office Action dated Feb. 28, 2025, from related Korean Patent Application 10-2021-7014711 (10 pages).

Israeli Office Action dated Aug. 5, 2025, from related Israeli Patent Application 282277 (4 pages).

Schulz, Jens, et al. Estimation of collective maneuvers through cooperative multi-agent planning. In: 2017 IEEE Intelligent Vehicles Symposium (IV). IEEE, Jun. 11, 2017. p. 624-631. DOI:10.1109/IVS.2017.7995788.

* cited by examiner

For each agent:

Hypothesise possible goals from context — SB2

For each hypothesised goal:

Synthesis a set of $n$ predicted paths for that goal — SB4

Match observed trace to path distribution for that goal to determine likelihood of goal — SB6

Gaussian process fitted to driving trajectories obtained from CCTV.

AUTONOMOUS VEHICLE PLANNING AND PREDICTION

CROSS-REFERENCE TO RELATED APPLICATIONS

This application claims the benefit under 35 U.S.C. § 120 as a continuation of U.S. patent application Ser. No. 17/285, 294, filed Apr. 14, 2021, which is a national stage filing under 35 U.S.C. 371 of International Patent Application Serial No. PCT/EP2019/078062, filed Oct. 16, 2019, which claims priority to United Kingdom patent application number GB 1816850.0, filed Oct. 16, 2018, to United Kingdom patent application number GB 1816852.6, filed Oct. 16, 2018, and to United Kingdom patent application number GB 1816853.4, filed Oct. 16, 2018. Each of the foregoing applications is incorporated by reference herein in its entirety.

TECHNICAL FIELD

This disclosure relates to prediction methods which may be used as a basis for autonomous vehicle (AV) planning.

BACKGROUND

An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on inputs from the sensor system. A fully autonomous or "driverless" vehicle has sufficient decision-making capability to operate without any input from a human driver. However the term autonomous vehicle as used herein also applies to semi-autonomous vehicles, which have more limited autonomous decision-making capability and therefore still require a degree of oversight from a human driver.

In order to navigate an encounter driving scenario safely and effectively, an autonomous vehicle planner needs to be able to plan in a way that takes into account the anticipated behaviour of other vehicles/agents.

SUMMARY

A first aspect of the invention provides a computer-implemented method of predicting an external actor trajectory, the method comprising:

receiving, at a computer, sensor inputs for detecting and tracking an external actor:

applying object tracking to the sensor inputs, in order track the external actor, and thereby determine an observed trace of the external actor over a time interval;

determining a set of available goals for the external actor:

for each of the available goals, determining an expected trajectory model; and comparing the observed trace of the external actor with the expected trajectory model for each of the available goals, to determine a likelihood of that goal.

The external actor may be an external vehicle or another external actor such as a pedestrian, cyclist etc. In the examples that follow, the external actor is an external vehicle, however it will be appreciated that the relevant description applies equally to other forms of external actor.

In embodiments, the method may be implemented in an autonomous ego vehicle, wherein a planner of the autonomous vehicle makes an autonomous driving decision in dependence on the likelihood of at least one of the available goals, the sensor inputs obtained using a sensor system of the autonomous vehicle.

The expected trajectory model may be a single predicted trajectory associated with that goal or a distribution of predicted trajectories associated with that goal.

The expected trajectory model may be a distribution comprising a conditional probability $p(T|G_i)$ for each predicted trajectory $T$ in a set of predicted trajectories and the likelihood of that goal $p(G_i|\tau)$ may be used to estimate at least one predicted trajectory probability $p(T|\tau)$ given the observed trace $\tau$.

The expected trajectory model may be determined for each goal based on a desired goal location of that goal.

The expected trajectory model may be determined by executing a generative model for each goal, the generative behaviour model having been trained to generate trajectories based on examples of real-world driving behaviour.

The models may be specific to a driving area in relation to which the method is applied.

The expected trajectory model may be determined by applying a sampling algorithm to sample a space of predicted trajectories, which is defined for each goal based on one or more parameters of that goal and one or more parameters of the external agent.

The set of available goals may be determined based on map data associated with the external agent.

The expected trajectory model may be determined based on one or more ego vehicle parameters to model the other actor's response to ego vehicle behaviour.

The observed trace may be used to predict a best-available trajectory model for the goal, and said comparison may comprise comparing the best-available trajectory model with the expected trajectory model.

The observed trace may be used to predict a current maneuver and/or a future maneuver of the external actor, the predicted current or future maneuver being used to determine the best-available trajectory model.

A sequence of multiple maneuvers may be determined for at least one goal, and the best-available trajectory model may be determined for that goal based on partial trajectory models respectively associated with the multiple maneuvers.

Each partial trajectory model may comprise one or more target motion values, and one or more motion values of a future portion of the best-available trajectory model may be determined by applying motion smoothing to the target motion values.

The expected trajectory model for each goal may be a single expected trajectory for that goal, and the best-available trajectory model for each goal may be a single best-available trajectory.

The partial trajectory model for each maneuver may be a most-likely partial trajectory for that maneuver.

A defined cost function may be applied to both the expected trajectory model and the best-available trajectory model for each goal, to determine respective costs of those trajectory models, wherein said comparison comprises comparing those costs.

The cost function may reward reduced driving time whilst penalizing unsafe trajectories.

The cost function may also penalizes lack of comfort.

A second aspect of the invention provides a computer-implemented method of predicting an external actor trajectory, the method comprising:

receiving, at a computer, sensor inputs for detecting and tracking an external actor:

applying object tracking to the sensor inputs, in order track the external actor, and thereby determine an observed trace of the external actor over a time interval:

determining a set of possible maneuvers for the external actor;

for each of the possible maneuvers, determining an expected trajectory model; and comparing the observed trace of the external actor with the expected trajectory model for each of the available maneuvers, to determine a likelihood of that maneuver.

The method may be implemented in an autonomous vehicle, and a planner of the autonomous vehicle may make an autonomous driving decision in dependence on the likelihood of at least one of the available maneuvers.

The expected trajectory model may be a single predicted trajectory associated with that maneuver or a distribution of predicted trajectories associated with that maneuver.

The observed trace may be compared with a most-likely trajectory of the distribution of predicted trajectories.

Another aspect provides an autonomous vehicle computer system comprising a prediction component configured to implement any method herein, and a planner configured to make autonomous driving decisions using outputs of the prediction components.

The prediction component may be configured to implement the method of the first aspect or any embodiment thereof to provide a goal prediction for an external agent and the method of the second aspect or any embodiment thereof to provide a maneuver prediction for the external agent.

The maneuver prediction may be used to make the goal prediction.

An autonomous vehicle may comprise the autonomous vehicle computer system and a drive mechanism coupled to the planner and responsive to control signals generated by the planner.

Another aspect of the invention comprises an AV planning method comprising the above steps and a step of an AV planner generating, based on the determined likelihood of at least one of the goals, control signals for controlling the operation of an AV.

In embodiments, the expected trajectory model associated with each goal may comprise a predicted trajectory associated with that goal or a distribution of predicted trajectories associated with that goal.

The distribution for each goal $G_i$ may comprise a conditional probability $p(T|G_i)$ for each predicted trajectory T in a set of predicted trajectories and the likelihood of that goal $p(G_i|\tau)$ may be used to estimate at least one predicted trajectory probability $p(T|\tau)$ given the observed trace $\tau$.

The control signals may be generated based on the determined likelihood of the at least one goal and the expected trajectory model for that goal.

The expected trajectory model may be determined for comparing with the observed trace based on one or more initial parameters of the external agent (e.g. at the start of the time interval—time t). The expected trajectory model may be updated for generating the control signals based on one or more updated parameters of the external agent (e.g. at the end of the time interval—time t+ΔT).

The parameters of the external agent may be observed parameters, i.e. derived from the sensor inputs.

The one or more parameters of the external agent may comprise a location of the external agent (at the applicable time).

The expected trajectory model may be determined based on one or more parameters of the goal.

The one or more parameters of the goal may for example comprise a desired location to be reached. That is, each goal may be parameterized by a respective desired location.

The expected trajectory model may be determined by executing a generative model in the computer system for each goal. The generative model may be executed based on the above one or more observed parameters of the external agent and the above one or more parameters of the goal.

The expected trajectory model may be determined by applying a sampling algorithm to sample a space of predicted paths, which is defined for each goal based on the one or more parameters of that goal and the one or more parameters of the external agent.

The sampling algorithm may be a randomized sampling algorithm which randomly samples the search space to determine a predicted path distribution, based on one or more randomized input parameters.

For example, the sampling algorithm may be a rapidly expanding random tree (RRT).

The generative model may be a machine learning (ML) model which has been trained on examples of real-world driving behaviour. Such examples may be extracted from real-world driving behaviour data as captured by monitoring one or more driving areas.

For example, the generative model may comprise a neural network or other machine learning (ML) model which may have been trained to generate expected trajectory models based on real-world examples of goal execution.

As another example, the generative model may be a model pre-determined for a driving area to which the method is applied, such as a spatial Markov model. The model may have been pre-determined based on real-world driving behaviour observed in that driving area.

The generated model may be executed initially based on the initial parameter(s) of the external agent to determine the expected trajectory model for comparing with the observed trace, and subsequently re-executed based on the updated parameter(s) of the external agent for generating the control signals.

The method may comprise determining at least one predicted trajectory for the external agent after the time interval based on the determined likelihood of at least one of the goals and the (updated) expected trajectory model determined for that goal.

A likelihood of the at least one predicted trajectory after the time interval may be determined based on the likelihood of the goal and the (updated) expected trajectory model.

The control signals may be generated based on the at least one predicted trajectory.

The set of available (hypothesised) goals may be determined based on map data associated with the external agent.

The one or more goal parameters may also be determined based on the map data associated with the external agent.

The map data may be derived at least in part from the sensor inputs.

The expected trajectory model may be computed by applying a generative behaviour model to one or more observed parameters of the external agent as derived from the AV sensor signals.

The generative behaviour model may also be applied to one or more ego vehicle parameters (to model the other actor's response to an ego vehicle being controlled by the planning method) and/or one or more parameters of the driving scenario (such as road layout/other driving environment parameters to model the other actor's response to its environment).

The method may comprise a step of determining at least one predicted trajectory for the external actor based on the expected trajectory model for at least one of the goals and a determined likelihood of that goal.

The expected trajectory model may be updated to account for changes in the parameter(s) to which the generative behaviour model is applied (e.g. to account of actual behaviour of the external actor in the time interval).

Further aspects of the invention provide a computer system comprising execution hardware configured to execute any of the method steps disclosed herein, and a computer program comprising executable instructions configured, when executed, to implement any of the method steps.

Yet further aspects provide an autonomous vehicle (AV) planner embodied in a computer system and configured to implement any of the method steps disclosed herein and an autonomous vehicle comprising the autonomous vehicle planner and a drive mechanism coupled to the autonomous vehicle planner and responsive to control signals generated by the AV planner.

BRIEF DESCRIPTION OF FIGURES

For a better understanding of the present invention, and to show how embodiments of the same may be carried into effect, reference is made to the following figures in which.

DETAILED DESCRIPTION

Example embodiments of the present invention are described in detail below. First some useful context to the invention is described.

Figure 1:
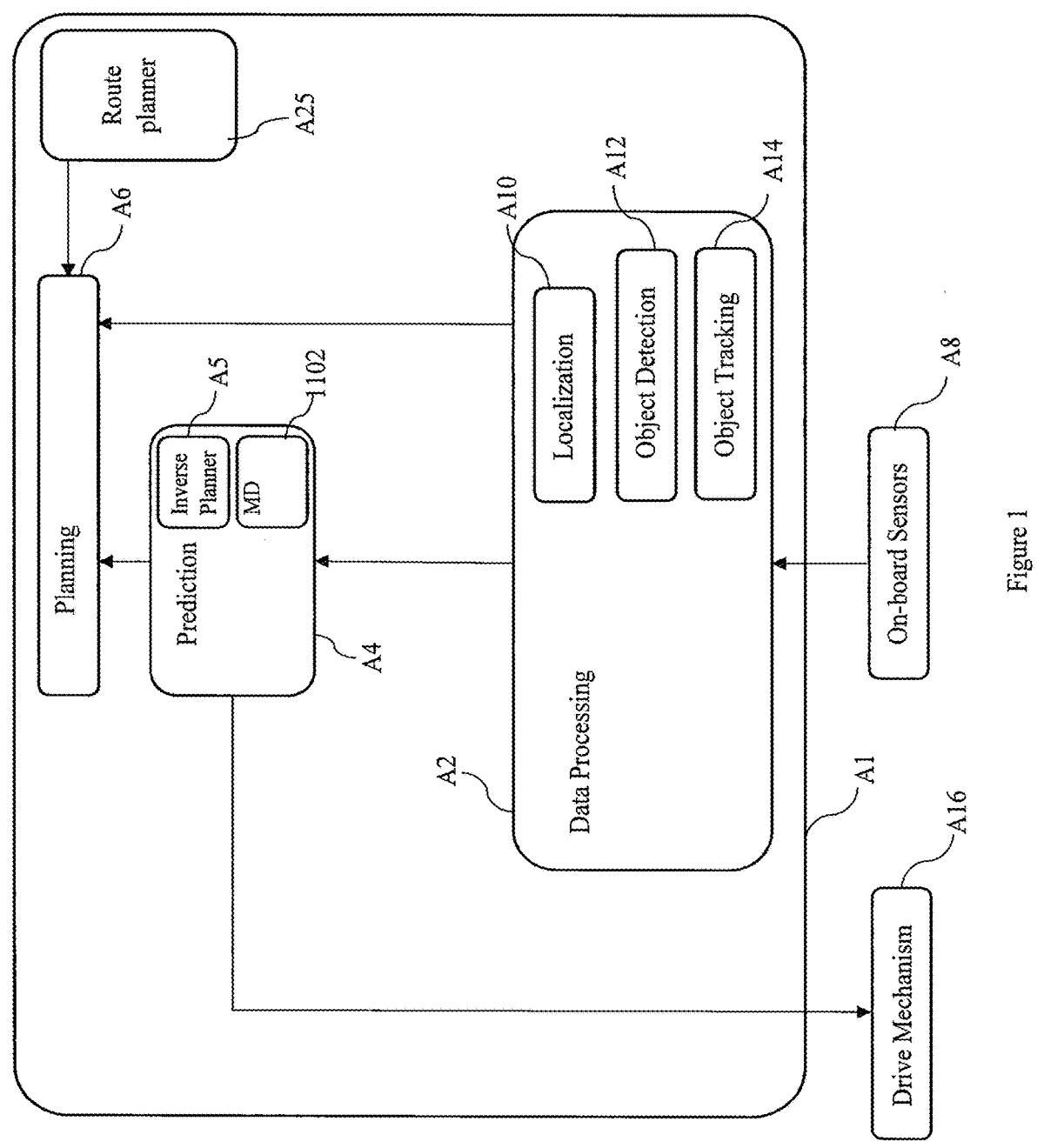
FIG. 1 shows a schematic functional block diagram showing functional components implemented in an autonomous vehicle computer system.

FIG. 1 shows a highly schematic functional block diagram of certain functional components embodied in an on-board computer system A1 of an AV (ego vehicle), namely a data processing component A2, a prediction component A4 and an AV planner A6.

The data processing component A2 receives sensor data from an on-board sensor system A8 of the AV. The on-board sensor system A8 can take different forms but generally comprises a variety of sensors such as image capture devices (cameras), LiDAR units etc., satellite-positioning sensor(s) (GPS etc.), motion sensor(s) (accelerometers, gyroscopes etc.) etc., which collectively provide rich sensor data from which it is possible to extract detailed information about the surrounding environment and the state of the AV and other actors (vehicles, pedestrians etc.) within that environment.

Note however that the present-techniques are not limited to using image data and the like captured using on-board optical sensors (image capture devices, lidar etc.) of the AV itself.

The method can alternatively or additionally be applied using externally-captured sensor data, for example CCTV images etc. captured by external image capture units in the vicinity of the AV. In that case, at least some of the sensor inputs used to implement the method may be received by the AV from external sensor data sources via one or more wireless communication links.

The data processing system A2 processes the sensor data in order to extract such information therefrom. This will generally involve various forms of machine learning (ML)/artificial intelligence (AI) processing. Functions of the data processing system A2 that are relevant in the present context include localization (block A10), object detection (block A12) and object tracking (block A14).

Localization is performed to provide awareness of the surrounding environment and the AV's location within it. A variety of localization techniques may be used to this end, including visual and map-based localization. By way of example, reference is made to United Kingdom patent Application No. 1812658.1 entitled "Vehicle Localization", which is incorporated herein by reference in its entirety. This discloses a suitable localization method that uses a combination of visual detection and predetermined map data. Segmentation is applied to visual (image) data to detect surrounding road structure, which in turn is matched to predetermined map data, such as a HD (high-definition) map, in order to determine an accurate and robust estimate of the AV's location, in a map frame of reference, in relation to road and/or other structure of the surrounding environment, which in turn is determined through a combination of visual detection and map-based inference by merging visual and map data. To determine the location estimate, an individual location estimate as determined from the structure matching is combined with other location estimate(s) (such as GPS) using particle filtering or similar, to provide an accurate location estimate for the AV in the map frame of reference that is robust to fluctuations in the accuracy of the individual location estimates. Having accurately determined the AV's location on the map, the visually-detected road structure is merged with the predetermined map data to provide a comprehensive representation of the vehicle's current and historical surrounding environment in the form of a live map and an accurate and robust estimate of the AV's location in the map frame of reference. The term "map data" in the present context includes map data of a live map as derived by merging visual (or other sensor-based) detection with predetermined map data, but also includes predetermined map data or map data derived from visual/sensor detection alone.

Object detection is applied to the sensor data to detect and localize external objects within the environment such as vehicles, pedestrians and other external actors whose behaviour the AV needs to be able to respond to safely. This may for example comprise a form of 3D bounding box detection, wherein a location, orientation and size of objects within the environment and/or relative to the ego vehicle is estimated. This can for example be applied to (3D) image data such as RGBD (red green blue depth.), LiDAR point cloud etc. This allows the location and other physical properties of such external actors to be determined on the map.

Object tracking is used to track any movement of detected objects within the environment. The result is an observed trace ($\tau$) of each object that is determined over time by way of the object tracking. The observed trace $\tau$ is a history of the moving object, which captures the path of the moving object over time, and may also capture other information such as the object's historic speed, acceleration etc. at different points in time.

Used in conjunction, object detection and object tracking allow external actors to be located and tracked comprehensively on the determined map of the AV's surroundings.

Object detection and object tracking are well-known per-se, and can be performed in the present context using various publicly available state-of-the-art models.

Through the combination of localization, object detection and object tracking, the data processing component A2 provides a comprehensive representation of the ego vehicle's surrounding environment, the current state of any external actors within that environment (location, heading, speed etc. to the extent they are detectable), as well as the historical traces of such actors which the AV has been able to track. This is continuously updated in real-time to provide up-to-date location and environment awareness.

The prediction component A4 uses this information as a basis for a predictive analysis, in which it makes predictions about future behaviour of the external actors in the vicinity of the AV. Examples of suitable prediction methodologies are described below.

At least one probabilistic prediction may be determined for an external actor. This could for example be a distribution over possible maneuvers for the agent $P(M|\tau)$ and/or a distribution over possible goals $P(G|O)$ (see below).

The notation O means a set of observations. The observations O may be the observed trace T itself ($O=\tau$), but O not necessarily limited in this respect. For example, in one implementation, the observations O could comprise a maneuver $M_j$ of the agent, in which case the notation $P(G|M_j)$ may be used (possibly as shorthand, since the observations O could include additional parameter(s)) (noting also that maneuvers may be inferred from the trace $\tau$).

The AV planner A6 uses the extracted information about the ego's surrounding environment and the external agents within it, together with the behaviour predictions provided by the prediction component A4, as a basis for AV planning. That is to say, the predictive analysis by the prediction component A5 adds a layer of predicted information on top of the information that has been extracted from the sensor data by the data processing component, which in turn is used by the AV planner A6 as a basis for AV planning decisions. This is generally part of hierarchical planning process, in which the AV planner A6 makes various high-level decisions and then increasingly lower-level decisions that are needed to implement the higher-level decisions. The end result is a series of real-time, low level action decisions. In order to implement those decisions, the AV planner A6 generates control signals, which are input, at least in part, to a drive mechanism A16 of the AV, in order to control the speed and heading of the vehicle (e.g. though steering, breaking, accelerating, changing gear) etc. Control signals are also generated to execute secondary actions such as signalling.

Embodiments of the invention will now be described by way of example only.

Inverse Planning

To assist the AV planner A6 in making AV planning decisions, such as determining a sequence of manoeuvres, actions etc. to be taken by the ego vehicle to execute a defined goal safely and effectively, the inverse planner A5 predicts the movement of nearby external actors, which may be referred to as agents in the present context.

Inverse planning may be implemented at the manoeuvre level, in order to make a probabilistic prediction about a current manoeuvre of an external actor. For example, the inverse planner A5 may predict a probability distribution $P(M|\tau)$ over a set of available manoeuvres M, such as "follow lane", "switch lane" switch lane etc., given a set of relevant observations comprising (or derived from) the trace t. Inverse planning at the manoeuvre-level is a form of (probabilistic) manoeuvre detection.

Alternatively or additionally, inverse planning may be implemented at the goal-level, in order to make a probabilistic prediction about a current goal of an external actor. For example, the inverse planner A5 may predict a probability distribution $P(G|O)$ over a set of available goals G. For example, in driving scenario with a left turn, the goals could be a "turn left" goal or a "continue straight" goal (i.e. remain on the current road and do not take the left turn), captured as suitable goal locations. Inverse planning at the goal-level is a form of (probabilistic) goal recognition.

Goal recognition and maneuver detection will typically operate on different time scales. Goal recognition generally considers longer time periods into the future than manoeuvre detection. For example, manoeuvre prediction may look a few second (e.g. of order $5s$) into the future, whereas goal recognition could (depending on the circumstances) look further ahead than this. Hence, goal recognition will generally consider longer trajectories (i.e. trajectories further into the future) than maneuver recognition.

A goal may for example be captured as a desired location (reference point) on the map (i.e. in the map frame of reference) which the ego vehicle is attempting to reach from a current location on the map, where the desired location is defined in relation to an encountered road layout. For example the desired location may be defined in relation to a particular junction, lane layout, roundabout exit etc. Given the surrounding road layout and any external actors, there will be various paths/actions the vehicle can take in order to successfully execute that goal by reaching reach the desired location. There will also be ego vehicle actions that would prevent the ego vehicle from doing so, for example a poorly-chosen sequence of initial actions might result in the vehicle being forced to take an unwanted roundabout exit or otherwise abort a goal due to the behaviour of an external actor when continuing to execute the goal would be unsafe. Incorporating reliable predictions as to the behaviour of external actors into the planning helps the AV planner A6 to plan safely and effectively, minimizing the occurrence of aborted goals.

When implemented at the goal-level, inverse planning hypothesises different possible goals for each external agent and then generates trajectories of how the agent might achieve each goal, and the likelihood that it would follow each trajectory. An underlying assumption is that each external agent will act in a manner that can be predicted using a generative model.

Inverse planning in the present context refers to a particular class of prediction methods that may be implemented by the AV prediction component A4. That is to say, an inverse planning method is a particular method of predicting the behaviour of external actors, and other vehicles in particular, by assuming that external actors plan in a predictable fashion.

The term "inverse planning" refers to this underlying assumption that an external actor will plan its decisions in a predictable manner. More formally, the assumption is that the other vehicle will plan and execute with a generative model that can be hypothesised.

Figure 2:
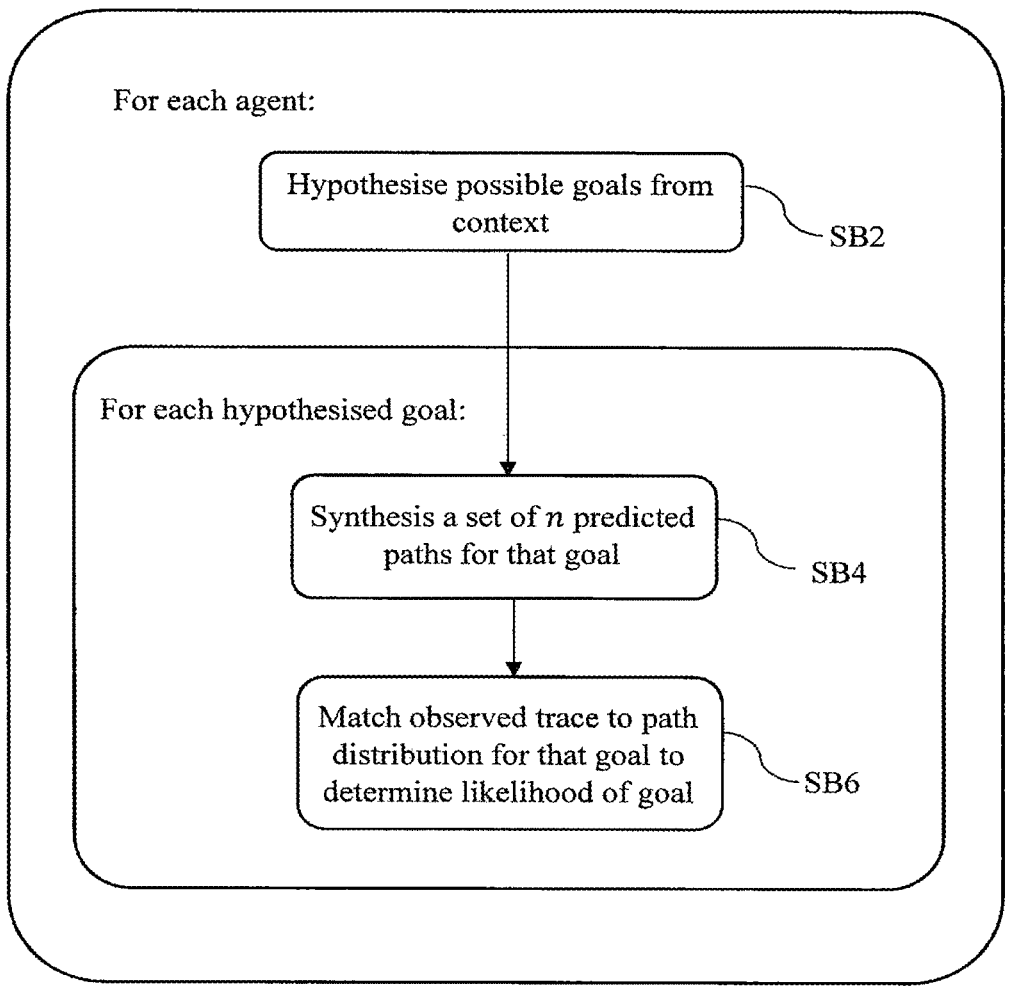
FIG. 2 shows an example game tree that may be used for autonomous vehicle manoeuvre planning.

An inverse planning method that will now be described with reference to FIG. 2, which shows a flow chart for the method. This considers inverse planning at the goal level but the underlying principles apply equally to inverse planning at the maneuver level. The steps of the method are carried out by the inverse planner A5 repeatedly, in real-time or pseudo real-time, so that sufficiently up-to-date predictions are always available to the AV planner A6. The method makes use of the information provided by the data processing system A2, i.e. the information about the surrounding environment/road-layout, the location/state of any other actors within the environment, and the traces of those actors(s) as observed through object tracking.

The following steps are performed for each of the one or more external actors (vehicles, pedestrians, cyclists etc.) under consideration, those actors being vehicles other than the AV in the following examples.

At step SB2, a set of hypothesised goals is determined for the other vehicle in question. An assumption is that the other vehicle is currently executing one of these goals. In order to determine an appropriate set of hypothesised goals, a driving context, such as the road-layout in the vicinity of the other vehicle, is determined.

External agent goals are generally hypothesised based on the map. For example, given a set of external vehicles in the vicinity of a road junction, roundabout or other road layout indicated on the map (the driving context), suitable goals may be hypothesised from the road layout alone (without taking into account any observed historical behaviour of the agent). By way of example, if the other vehicle is currently driving on a multi-lane road, with no nearby junctions, the set of hypothesised goals may consist of "follow lane" and "switch lane". As another example, with a set of external agents in the vicinity of a left-turn junction, the hypothesised goals may be turn left and continue straight. As indicated, such goals are defined with reference to suitable reference points on the map.

However, goals may be hypothesised in various ways. For example, observed historical behaviour (such as a trace observed prior to time t) may be taken into account in hypothesising external agent goals, or a combination of map-based and historical behaviour-based inference may be used to hypothesise the goals.

Note that, even when historical behaviour is not used to hypothesise the available goals, it is nonetheless used to determine the likelihood of each of those goals (see below).

Having determined the set of hypothesised goals, the following steps are performed for each of those goals:—

At step SB4, an expected trajectory model is determined for the hypothesised goal in question. The expected trajectory model is a model that simulates future behaviour of the other vehicle on the assumption that it is executing that particular goal. In particular, the expected trajectory model indicates how likely it is that the other vehicle will take a particular path or paths (trajectories) within a given time period $\Delta t$ (from time t to time $t+\Delta t$) assuming that it is executing that goal during that time period $\Delta t$. As indicated, the goal the vehicle is executing may be parameterized by an end point based on the map. For example, if the goal is to continue straight (rather than, say, turn left) the end point may be a point on the road at a set distance, say 40 m, ahead of the vehicle in the same lane. Alternatively, in e.g. a multi-lane scenario, the goal location could be some distance along the road ahead without specifying a specific lane (see below for further details).

The expected trajectory model may simply be a (single) predicted path for a given goal, but in the present examples it takes the form of a predicted path distribution for the goal in question. The predicted path distribution is provided for each goal in the present instance by synthesizing a discrete set of n predicted paths for the goal in question given a location $r_t$ of the external vehicle at time t, thereby providing a predicted path distribution for at least the time interval $\Delta t$.

Figure 3A:
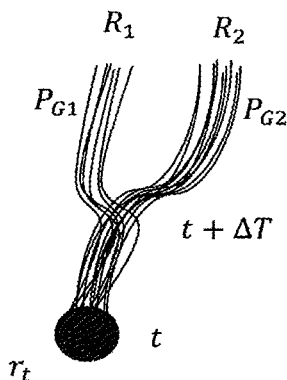
FIGS. 3A-C illustrate certain principles of inverse planning by example.

By way of example, FIG. 3A shows respective sets of predicted paths $P_{G1}$, $P_{G2}$ for goals G1 and G2 respectively as predicted for a particular external vehicle. The goals $G_1$, $G_2$ are defined with respect to reference locations $R_1$, $R_2$ respectively in the map frame of reference, which can be points or areas on the map. Given the location $r_t$ of the external vehicle at time t and the reference points $R_1$, $R_2$ of each goal, the predicted path sets $P_{G1}$, $P_{G2}$ are synthesized for goals $G_1$, $G_2$ respectively.

Although in this example, each goal is defined simply with respect to a single reference point/area, as will be appreciated, goals can be defined in other ways, for example with reference to multiple reference points as appropriate in the circumstances. In general, a goal is defined by a set of one or more goal parameters, which in turn are generally defined in the map frame of reference in the context of autonomous driving. A reference location in the map frame of reference is one example of a goal parameter, and all description pertaining to such reference locations applies equally to other types of goal parameter.

Following the left turn example, one set of paths would be generated for the "continue straight" goal, which are paths it is predicted the other vehicle might take were it executing the "continue" goal, and another set of paths would be generated for the "turn left" goal, which are paths it is predicted the other vehicle might take were it executing the "turn left" goal.

A generative model may be used to synthesise these paths. The underlying assumption is that the other vehicle will plan and execute with this model. That model could correspond to the AV planner A6 itself (on the assumption that other vehicles will plan in the same way as the ego vehicle), but it may also be different from the AV's own planner.

For example, the paths can be synthesised for each goal using a Rapidly Exploring Random Tree (RRT) model. Following the example of FIG. 3A, for each goal $G_1$, $G_2$, a space of predicted paths (search space) is defined based on the reference location for that goal ($R_1$, $R_2$ respectively) and the current location $r_0$ of the external vehicle. The search space is then randomly sampled (based on randomized input parameters), in order to determine the set of n paths, and a likelihood of each of those paths. To simulate n paths for each goal, the relevant parameters of the RRT are randomized n times to perform n appropriately biased random searches of the search space.

By way of example, GB Patent Application No. 1803292.0 entitled "Efficient computation of collision probabilities for safe motion planning", which is incorporated herein by reference in its entirety, discloses an RRT model which can be used in the present context to implement inverse planning. The probabilistic risk of collision along a given trajectory is calculated, and used to rank order the candidate trajectories by safety. This in turn provides the likelihood of each sampled path on the assumption that the external vehicle is more likely to take safer paths to execute the goal in question. That is, path probabilities can be determined based on assumed relationship to safety. The sampled paths and their probabilities are one example of a trajectory model.

However, this is just one example of a suitable generative model, and other forms of generated model may also be used. An example of an alternative trajectory model is described later.

One such example is a neural network-based model which has been trained to output a path prediction model (e.g. a predicted path or a distribution of predicted paths) given an observed trace and a goal to be executed. The network is trained based on real-world driving behaviour examples. For example, the neural network may be trained based on examples extracted from a large corpus of CCTV (closed circuit television) data that has been captured in urban driving environments.

Another example is a spatial Markov model (or similar), which may be predetermined for a particular driving area by monitoring the driving area over a sufficient time period (see above).

In general, the inverse planner A5 can be any model which can reason in relation to different hypothesised goals.

At step SB6, the trace of the other vehicle as actually observed over the time period $\Delta t$ (i.e. between time t and t+$\Delta t$) is matched to the distribution of paths associated with the goal in question for that time period $\Delta t$, in order to determine a likelihood for that goal.

Figure 3B:
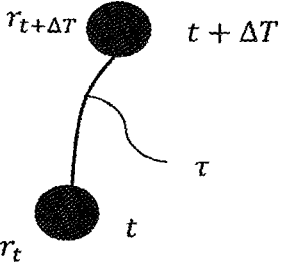

By way of example, FIG. 3B shows an actual observed trace $\tau$ of the vehicle in question between time t and t+$\Delta t$. By matching the actual trace $\tau$ to the predicted path distribution for each of the goals $G_1$, $G_2$ (FIG. 3A) a likelihood of each goal $G_1$, $G_2$ can be determined probabilistically for the time interval $\Delta t$. This can be a form of soft-matching. The goal likelihood can be captured as a conditional probability of each hypothesised goal $G_i$ given the observed trace t of the external vehicle, i.e. $p(G_i|\tau)$, which is the estimated probability that the external vehicle was executing that goal $G_i$ over the time interval $\Delta t$ given the observed trace $\tau$.

In other words, the inverse planner A5 is used to predict, for each of the hypothesised goals, a set of possible paths that the other vehicle might have taken in the time interval $\Delta t$ and a likelihood of each of those paths, on the assumption that the other vehicle was executing that goal during that time period (i.e. what the other vehicle might have done during time interval $\Delta t$ had it been executing that goal). This is then compared with the actual trace of the other vehicle within that time period (i.e. what the other vehicle actually did), to determine a likelihood of each goal for the time period $\Delta t$.

Figure 3C:
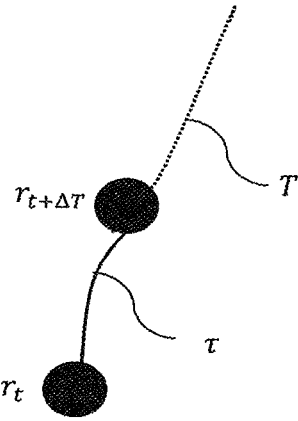

With reference to FIG. 3C, now that the likelihood of each goal, given the observed trace $\tau$, is known, the (absolute) likelihood of any given predicted path (trajectory) T after time t+$\Delta t$, given the observed trace $\tau$, can for example be determined as:

$$p(T|\tau) = \sum_i p(T|G_i) \, p(G_i|\tau)$$

where $p(G_i|\tau)$ is defined above and $p(T|G_i)$ is an estimated probability of the agent taking path T given a path distribution for goal $G_i$ at time t+$\Delta t$. Note, the notations "$\Delta t$" and "$\Delta T$" are equivalent herein. Note also the distinction between the mathematical notation used to represent trajectories (lower or uppercase Greek letter "tau", i.e. $\tau$, T) and the notation used to represent time (lower case or uppercase Latin "t", i.e. t, T).

A trajectory can be a simple spatial path but the description applies equally to trajectories that incorporate motion information (such speed/velocity information, acceleration). For the latter, two trajectories may correspond to the same spatial path (or at least respective portions of the trajectories may correspond to the same spatial path) but nonetheless be different trajectories e.g. because they are associated with different velocity information (e.g. one might correspond to a vehicle moving along substantially the same spatial path but at a lower speed, at least at some points along the spatial path). For example, a trajectory may take the form of a spatial path in combination with an associated velocity or a set of velocities associated with respective point or sections of the spatial path. An extension could additionally incorporated associated acceleration value(s) etc.

Although not shown in the Figures, the path distribution at time t+$\Delta t$—from which $p(T|G_i)$ is determined—can itself be determined by e.g. re-executing the inverse planner A5 at time t+$\Delta t$ for goal $G_i$ as above, but with a new determined location of the external agent $r_{t+\Delta t}$ at time t+$\Delta t$, in order to update the expected trajectory model accordingly. The goal parameters may or may not have been updated at this point for the purpose of re-executing the inverse planner A5. Where a data-driven behaviour model is used, similarly the behaviour model can be re-executed at that time, in order to update the expected trajectory model.

The above steps are performed repeatedly over time, possibly in real time. For an external agent that is some way off reaching its goal, initially it may not be possible to determine definitively which goal it is executing, because the path distributions for different goals are similar initially, and this will be reflected in the distribution of probabilities of over the set of hypothesized goals. As the path distributions diverge, the probability distribution will generally begin to skew towards a particular goal as the path distributions diverge.

Inverse Planning for Manoeuvres

The above considers inverse planning for goals. As indicated, inverse planning can also be implemented at the manoeuvre level, over a set of hypothesised manoeuvres M.

For example, if the other vehicle is currently driving on a multi-lane road, with no nearby junctions, the set of hypothesised manoeuvres M may consist of "follow lane" and "switch lane". In that case, one set of paths would be generated for the "follow lane" manoeuvre, which are paths it is predicted the other vehicle might take were it currently executing the "follow lane" manoeuvre, and another set of paths would be generated for the "switch lane" manoeuvre, which are paths it is predicted the other vehicle might take were it executing the "switch lane" manoeuvre. The above description applies equally to manoeuvre-level inverse planning, but with the set of hypothesised manoeuvres M in place of the set of hypothesised goals G.

For manoeuvre-level inverse planning, an observed trace t of the external agent can be used to estimate a probability of each manoeuvre $M_j \in M$ of the set of possible manoeuvres M. For each maneuver $M_j \in M$, a predicted trajectory model is determined for time t, as in FIG. 3A. The predicted trajectory model can be single trajectory or a trajectory distribution. Then, by comparing the actual observed trace t to the trajectory model for each maneuver $M_j$ (as in FIG. 3B), a probability of that maneuver $P(M_j|\tau)$ can be estimated based on the extent to which the observed trace t matches the trajectory model for that maneuver M. As above, this can be a form of soft-matching.

In the following example, in order to simplify the computations, each maneuver $M_j$ is mapped to a single trajectory for the purpose of inverse planning. For a maneuver that is associated with a trajectory distribution, the mode or most-likely trajectory of the distribution may be taken for the purpose of inverse planning. In that case, there is assumed to exist a single trajectory $T_j$ such that $$P(T_j \mid M_j) = 1$$

and the probability of all other trajectories is assumed to be zero.

The notation used above distinguishes between a trajectory $T_j$ associated with a given manoeuvre $M_j$ and a trajectory $T$ evaluated with respect to a given goal $G_i$.

In order to reach the goal $G_i$, the external agent may execute a sequence of manoeuvres, e.g. $(M_j, M_k \ldots)$. In that case, an overall goal trajectory (i.e. to reach the goal $G_i$) may be determined as a combination of maneuver trajectories associated with the individual maneuvers $M_i, M_j, \ldots$. For example, in the implementation described below, a goal trajectory is determined by combining maneuver trajectories and applying velocity smoothing thereto. For this reason, a trajectory $T_i$ associated with (or evaluated in relation to) a maneuver $M_i$ may be referred to as a "partial trajectory" and a trajectory $T$ associated with (or evaluated in relation to) a goal may be referred to as a "full trajectory".

Where multiple trajectories to a particular goal $G_i$ are considered, the notation $T^{(n)}$ may be used in place of $T$ to refer to the nth trajectory to the goal $G_i$.

This above simplifying assumption of a "one-to-one" relationship between partial trajectories and manoeuvres has been found to give acceptable performance with a reduced computational burden. However, alternative implementations, which do not make this implying assumption of a "one-to-one" relationship between trajectories and manoeuvres are nonetheless viable. Without this simplifying assumption, a more general Bayesian still relation holds:

$$p(T_j \mid \tau) = \sum_i p(T_j \mid M_i) \; p(M_i \mid \tau)$$

where $p(T_k \mid M_j) \in [0,1]$ is the probability of partial trajectory $T_j$ given maneuver $M_j$. In that case, rather than assuming the mode/most likely partial trajectory, partial trajectories could instead be sampled from $p(T_j \mid M_j)$, and all description herein pertaining to the mode/most likely partial trajectory applies equally to a sampled trajectory in that case.

Inverse Planning—Example Implementation

By way of further illustration, an example implementation of inverse planning for goal recognition will now be described in further detail. This uses inverse planning at the goal-level to predict a probability distribution $P(G \mid O)$ over a set available goals $G$ for at least one external agent, i.e. for each available goal, an estimated probability that the agent is currently implementing that goal.

The described implementation additionally uses probabilistic manoeuvre detection to predict a distribution $P(M \mid \tau)$ over a set of possible manoeuvres $M$ given an observed trace $t$ of the external agent, i.e. for each possible manoeuvre, an estimated probability that the agent is currently executing that manoeuvre. Maneuver predictions feed into goal predictions as described later. Maneuver detection can, for example, be implemented using inverse planning at the manoeuvre-level.

In other words, the described implementation reasons at both the manoeuvre-level and the goal-level.

Goal Recognition

Goal recognition is the process of inferring agent goals of an agent (external actor-which is a target vehicle in the following examples but can be another form of actor as noted) given observations of the agent's past actions and other contextual information.

In the present context, a goal would typically specify a target location for the vehicle over whose goals the inverse planner A24 is reasoning, such as the various exit points on a highway/junction or the different lanes. Knowledge of another agent's goals can inform the planning process because predictions can be made about the agent's behaviour in relation to its hypothesised goals.

Using goal recognition also adds to the "explainability" of the AV system. Explainability refers to the system's ability to explain its decisions to a human. Recording the goal inference process (what the ego vehicle believed the other vehicles' goals to be at different times) can provide interpretable information for decision tracing and debugging.

Goals may be inferred deterministically or probabilistically. In the following examples, goals are inferred probabilistically given a set of relevant observations O, i.e. a goal posterior $P(G \mid O)$ is estimated for a finite set of available goals G, with $P(G_i \mid O)$ being the probability that the external agent has goal $G_i \in G$ given the observations O.

In the context of MCTS, goals are inferred probabilistically so as to make a reasoned prediction about the external actor's future trajectory as the tree is rolled out in the above sense.

Maneuvers and Goals

First, an example scheme for determining available goals and manoeuvres is described. This description provides relevant context to the particular implementation of inverse planning that is described later. However, the description is not limited in this respect and applies equally to other implementations of MCTS, including alternative implementations of inverse planning/goal recognition and implementations which do not use goal recognition (e.g. the examples given above which use dada-driven behaviour models without higher-level goal recognition).

Multipolicy Baseline

A "multipolicy method" is used as a baseline. The underlying assumption of the multipolicy method is that all vehicles (or, more generally, external actors), including the ego vehicle, are at any time executing one of a finite number of maneuvers such as follow lane, lane change, turning, etc. Such maneuvers may also be referred to herein as "maneuver policies" (noting the distinction between a manoeuvre policy, i.e. a manoeuvre of a finite set of manoeuvres, and an action policy which may be used to execute a selected maneuver policy: note also that the English/American spellings of manoeuvre/maneuver are used interchangeably herein).

A "target" actor means an external actor whose behaviour is being predicted. Predictions may be made for one or multiple target vehicles (or other actors) and the above set of assumptions is applied to each target actor. The maneuver policy examples in the preceding paragraph are, in reality, "closed-loop", meaning that they take sensor feedback into account and automatically vary their speed and distance to a leading vehicle (the leading vehicle been a vehicle which the target vehicle is following). However, as explained below, for the purpose of inversely planning, they can be modelled as "open-loop" manoeuvres with the benefit of increased computational efficiency and without significantly affecting the performance of the inverse planner A24. The target and leading vehicles are cars in the following example but the description applies equally to any form of actor (vehicles, pedestrians, cyclists etc.). Similarly, this example considers an autonomous car (ego car) but the description applies to any form of autonomous vehicle.

Maneuver detection can be implemented using inverse planning at the manoeuvre-level, in the manner described above.

As another example, a separate manoeuvre detector (MD) 1102 of the prediction component A4 may implement a Bayesian changepoint detection. This method used to segment an observed low-level trajectory of a target vehicle into a sequence of maneuvers, and the most recent segment is used as a prediction of the car's currently executed maneuver. Using this prediction, a number of forward trajectories are simulated for each maneuver available to the ego car, and the maneuver with the best evaluation is chosen for execution. This, in turn, feeds into goal-level inverse planning in the example below.

Bayesian changepoint detection is known per se and refers to a probabilistic detection of changes in an underlying hidden state of a system. In the present context, the hidden state of an external actor at a particular time is defined as the manoeuvre policy it is executing at that time. This hidden state is not directly observable and therefore needs to be inferred though observations caused by the hidden state—the observed trace in this instance. This allows the probability of each available maneuver to be estimated at a current point in time, i.e. the probability that the external actor is currently executing that maneuver.

For example, a hidden Markov model (HHM) may be used to represent manoeuvres as hidden states of the HHM, in which the observed trace is modelled as arising from state transitions of the HMM.

As described below, it is possible to define a relatively small set of maneuver policies to significantly simply the planning process. It is possible to define such a small set because of the maneuver policies are defined in a way that encompasses low-level planning such as velocity and distance. Similarly, since other cars are assumed to be executing one of these same policies, their current maneuvers can be efficiently inferred given low-level trajectories.

This multipolicy method per se is myopic in that it only predicts the current maneuver of other cars, but it does not attempt to predict their future maneuvers. Inverse planning builds on this method to predict future actions as described later.

For example, a hidden Markov model (HHM) may be used to represent manoeuvres as hidden states of the HHM, in which the observed trace is modelled as arising from state transitions of the HMM.

As described below, it is possible to define a relatively small set of maneuver policies to significantly simply the planning process. It is possible to define such a small set because of the maneuver policies are defined in a way that encompasses low-level planning such as velocity and distance. Similarly, since other cars are assumed to be executing one of these same policies, their current maneuvers can be efficiently inferred given low-level trajectories.

This multipolicy method per se is myopic in that it only predicts the current maneuver of other cars, but it does not attempt to predict their future maneuvers. Inverse planning builds on this method to predict future actions as described later.

Maneuvers

Basic Maneuvers

Maneuvers represent the basic actions used for planning and predicting. The following "basic" (elementary) maneuvers are considered in this example:

lane follow lane change left/right turn left/right (turning into closest lane in driving direction)

stop/cautious

It will be appreciated that the described techniques can be extend to alternative or additional maneuvers.

Each basic maneuver has specified applicability and termination conditions associated therewith. A maneuver is only available in a given state if the state satisfies the maneuver's applicability condition. For example, a lane change left is only possible if there is a lane to the left of the car, and if there is sufficient open space on that lane for the car. Applicability conditions may also encode traffic rules. The maneuver terminates if the state satisfies the termination condition. For the lane change maneuver, this is the case once the car has arrived on the lane and is aligned with the lane direction.

Between start and end of a maneuver, the maneuver specifies a reference path to be followed by the ego car and the target velocities along the path. In the present context, a trajectory is defined as the pair (static reference path, target velocities). That is, as a static reference path plus an associated set of target velocities (see above).

However, in general, a maneuver be associated with multiple trajectories. For example, in the context of prediction, a manoeuvre could be associated with a trajectory distribution, i.e. set of trajectories each having a specified probability (i.e. the probability that the external actor will follow that trajectory assuming it is currently executing that maneuver).

Some maneuvers, such as lane follow and cautious, do not have natural termination conditions. For such maneuvers, a termination condition is specified as a parameter. "Macro actions" (see below) automatically set these parameters based on context information.

The cautious maneuver is a variant of a stopping maneuver which is used in macro actions. Cautious slows the car down and continues to move to a specified location given as parameter. At the location, the maneuver terminates if the terminal condition is satisfied, otherwise it fully stops the car and then terminates when the terminal condition is satisfied. The terminal condition is used to check for oncoming traffic in specified lanes (given as parameter). If no lanes are specified, then the terminal condition is always true. This allows the car to plan for safe and smooth entering/exiting when there is possible oncoming traffic. As a special case in cautious only for exit left/right macros, a forced termination is allowed if the oncoming vehicle is stopped and is predicted to remain stopped for at least the amount of time needed for the controlled car to complete the turn maneuver. This allows for special cases such as in Scenario 3 described below.

Some of the basic maneuvers are only used inside macro actions, either because they have additional parameters or because they are only possible in very specific locations, such as the turning maneuver.

The following example uses two types of basic maneuvers: open-loop maneuvers for inverse planning (prediction) or goal recognition more generally, i.e. by the goal recognition component A24 in FIG. 1, and closed-loop maneuvers for MCTS ego planning in the planner A6 of the AV. These are detailed in the sections below.

Closed-Loop Maneuvers

A basic maneuver is closed-loop if it uses feedback from sensors. This may cover different degrees of automation in maneuvers. Here, it is assumed each closed-loop maneuver automatically controls the car's velocity and distance to leading vehicle (a form of adaptive cruise control (ACC)). It is also assumed that each maneuver is capable of automatically initiating an emergency brake.

The system is agnostic about the specific implementation of maneuvers, and essentially views them as "black box" functions. This has the benefit of flexibility and allows different representations to be incorporated straightforwardly. Possible implementations include:

hard-coded heuristic using finite state machine or any programming logic
  lattice path planner using motion primitives defined by kinematic bicycle model
  constraint optimisation planner The planning methods in above list can be called repeatedly after state changes to make them closed-loop.

Open-Loop Maneuvers

In contrast to closed-loop maneuvers, open-loop maneuvers do not use sensor feedback. An open-loop maneuver specifies a reference path (or a distribution over paths) without attempting to correct these paths with feedback. This allows for simpler and computationally less costly implementations of maneuvers.

Again, the system is agnostic about the representation of open-loop maneuvers.

A simple but effective may of implementing open-loop maneuvers fits a polynomial function to a set of points extracted from the road topology. Target velocities may be set to a constant or other time series. This computes one trajectory rather than a distribution over trajectories, which has been found to be sufficient in many practical contexts.

Figure 5:
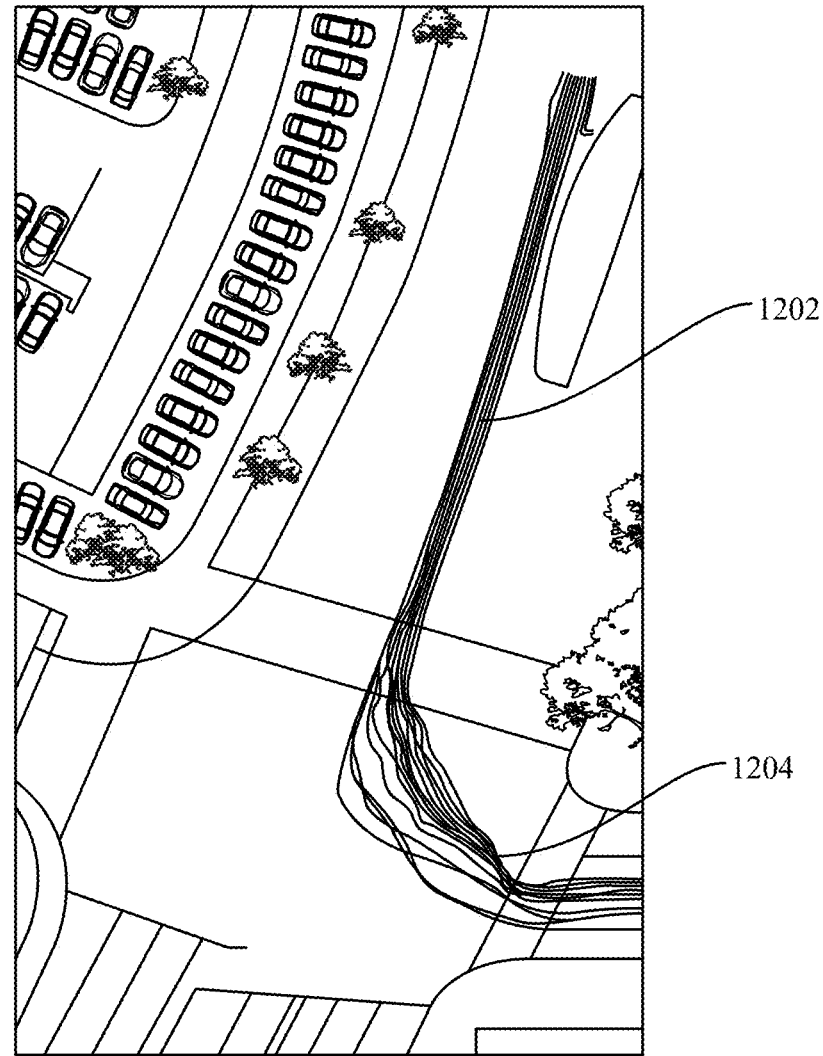
FIG. 5 shows an example of a trajectory model learned from CCTV data.

Another implementation uses a behaviour model of the kind described above, such as a Gaussian process or neural network, to collected driving trajectories. This trajectory data may be generated in different ways:

In simulation, under varying situations, using the corresponding closed-loop maneuver.
  From real driving data generated with the AV platform
  From real CCTV data, segmented into recognised maneuvers. By way of example, FIG. 5 shows an example of a Gaussian trajectory model 1202 fitted to trajectories observed in CCTV footage over time.

Conditions such as "wait until oncoming traffic is clear", as used in the cautious maneuver, may be realised in open-loop maneuvers by waiting for a specified time until the condition is predicted to be true (e.g. waiting until it is predicted that traffic is clear).

Target Velocities and Velocity Smoothing

As noted, in the present example, a trajectory is defined as a static path in combination with a set of target velocities.

Target velocities are set inside basic maneuvers. As a general principle, it may (for example) be assumed that vehicles will attempt to drive at a certain speed in a particular area (e.g. a speed limit). This target is reduced if there is a slower car in front (in which case that car's velocity is the new target) or if required due to curvature in the driving path etc.

For open-loop lane-follow, the target velocities are set to min (speed-limit, speed of car in front if any).

Due to its simplicity, this method is cheap to compute but it can lead to predicted trajectories for other vehicles which collide. For example, in Scenario 1 below, a truck is predicted to continue straight at speed limit (as no vehicle in front) and an over-take by Car 2 at the speed limit (during the lane follow segment of overtake) is also assumed. The predicted trajectories for Car 2 and Truck may collide because the inverse planning for Car 2 actually assumed a constant velocity for the truck. However, in this case and many other cases, it has been found that this discrepancy does not cause problems for the ego planner A6: safe and effective planning decision can still be taken using the predictive output of this simple method.

Within basic maneuvers that generate curved trajectories (e.g. turning and lane changing), the target velocities are set using a heuristic based on local curvature. This function is shown below, where $v_{target}$ is the target velocity, and $\psi$ is the point curvature. The other terms are constants set to appropriate values $$v_{target} = \max(v_{min}, v_{max} - c\psi)$$

Point curvature is given by the equation below, where x and y are Cartesian coordinates. The derivatives of x and y are estimated from the target path for the vehicle using finite differences:

$$\psi = \frac{|x'y'' - y'x''|}{\left(x'^2 + y'^2\right)^{\frac{3}{2}}}$$

Velocity Smoothing

Because velocities are set inside basic maneuvers, two subsequent maneuvers may have abrupt changes in velocities. The typical example is a lane-follow followed by a turn maneuver.

To compensate for this effect, a resulting complete trajectory across different maneuvers can be smoothed out in velocities to improve control and realism. A velocity smoothing function is used which optimises the target velocities in a given trajectory. Velocity smoothing is used for both prediction (inverse planning) and MCTS ego planning.

Velocity smoothing is formulated as an optimisation problem over a trajectory along the path given. Assuming a set of points at longitudinal positions, $$x_T^i,$$

and their respective target velocities $$v_T^i,$$

a continuous and differentiable function $\kappa: x \rightarrow v$ is fitted. Then, considering a time horizon $T_H$ (which could, for example, be estimated using the target velocities), the time elapsed between two time points $\Delta t$, and other parameters of the optimization (e.g. maximum speed, $v_{max}$, and acceleration, $\alpha_{max}$), the smoothing problem is defined as:

$$\min_{x_1,N,v_1,N} \sum_{t=1}^{N} \|v_t - \kappa(x_t)\|_2$$

$$\text{s.t.} \quad x_{t+1} = x_t + v_t \Delta_t$$

$$0 < v_t < v_{max}$$

-continued $$|v_{t+1} - v_t| < a_{max}\Delta t$$

$$N = \lceil T_H/\Delta t \rceil$$

From the solution of the problem, spatially re-sampling may be used to obtain values that are actually achievable at $$x_T^i.$$

The last achievable position is given by $X_N$. If $$x_N > \max(x_T^i),$$

then it is possible to re-sample from this solution only.

Alternatively, a similar problem can be solved starting from $X_N$, this procedure may be repeated until the condition is achieved.

It is also possible to model other parameter(s) relevant to the trajectory such as acceleration and impose constraints on such parameter(s) as an extension to the problem.

Velocity smoothing should respect zero-velocities in the input trajectory, which indicate full stops. A simple way of achieving this is to split a trajectory into segments separated by stopping events (zero velocity), and to apply the smoothing function to each segment.

Macro Actions

A special kind of maneuver, referred to herein as "macro actions", relieve the planner in two important ways: they specify common sequences of maneuvers, and they automatically set the free parameters in basic maneuvers based on context information (usually road layout).

In this example, the following macro actions are used (with maneuver parameters shown in brackets):

Continue lane: specifies the sequence <follow lane (until end of visible lane, i.e. lane goal)>

Exit left/right: specifies the sequence <follow lane (until at/near turning point), cautious (until oncoming traffic is clear/safe distance), turn left/right>. The exit point is automatically set to be the one corresponding to the goal of the ego car, allowing the macro action to skip earlier exit points (this is especially useful in roundabouts).

Cross road: specifies the sequence <follow lane (until at/near road crossing), cautious (until oncoming traffic from crossing road is clear/safe distance), follow lane (until after road crossing)>

Overtake: specifies the sequence <lane change right, follow lane (until ego car has passed other car(s)), lane change left>

The applicability condition of a macro action is given by the applicability condition of the first maneuver in the macro action, and possibly additional conditions. For example, the additional condition for <Exit right> is that the car is on the right-most lane in its driving direction, and that the target exit point is on the same lane in front of the car. The additional condition for <Cross road> is that there is a road crossing where the ego car has to give way ahead of another car (see Scenario 3 below). The termination condition of a macro action is given by the last maneuver in the macro action.

Macro actions can significantly speed up the planning and prediction processes, because a single macro action may be sufficient to accomplish a given goal. For example, in Scenario 2 below, if the ego car's goal is G3, then the single macro action <Exit right> will already accomplish the goal. Macro actions are also useful because they automatically take care of switching points between maneuvers, which otherwise would need to be planned for explicitly (for example, setting the open termination conditions of maneuvers such as lane following).

Macro actions as used in this work do not define a hierarchy of decomposable actions: they simply define sequences of actions in a flexible way. Macro actions are implicitly included in the planning search space.

As noted, for the particular example MCTS process described below, all basic maneuvers in macro actions are closed-loop, and for inverse planning all basic maneuvers are open-loop.

Goals and Goal Generation

Goals for Ego Car

Goals for the ego car are generated based on route planning. A route planner (A25, FIG. 1) takes as input an annotated road map (annotated with lane directions, traffic signs, etc.) and start/end locations. It computes a route from start to end location which specifies the sequence of road segments and directions that the ego car has to travel through. This route is passed down to the planner A6, where it is used to generate goals for the ego car as follows:

Conceptually, the planner A6 "zooms into" the map with a view region (e.g. square or circular or any suitable shape) centred on the ego car, similar to the scenario pictures shown below. This view region moves continually with the ego car. At any point in time, the ego car's goal is given either by the next exit point in the route (where the car needs to change from current road to a connecting road) or by the visible end of the current lane if the next exit point in the route is not yet visible. For example, in Scenario 1 below the next exit point is not visible, so the goal is G1. In Scenario 2 below, the exit point becomes visible and the new goal becomes G3.

Goals for Other Cars

Another car's goals may, for example, be defined as its possible exit points and the visible end of road in the car's direction, bounded by the ego car's view region. A heuristic goal generation function is used to enumerate the set of possible goals for a car in a given view region, using information about the road layout and traffic rules (e.g. using the SDL road graph). To reduce compute time when there are many goals (e.g. many exit points), the function may ignore an exit point goal for a car if there are already two earlier exit points on same lane in front of car.

Other types of goals could be specified, such as "I want you to be in front of me". Such goals could be added and removed dynamically based on the current configuration of cars in the environment. The scenario descriptions below give examples of goals.

Goal Recognition

In this example implementation, goal recognition is performed based on "cost penalties" as will now be described with reference to FIG. 4.

A "plan" in the present context means a sequence of one or more basic manoeuvres selected to reach a goal. In some cases, such a sequence of basic maneuvers could be defined by a macro action. With a macro action or some other sequence of multiple basic maneuvers, each basic maneuver is associated with a partial trajectory, and the partial trajectories are combined using velocity smoothing to determine a full trajectory for reaching the goal.

Figure 4:
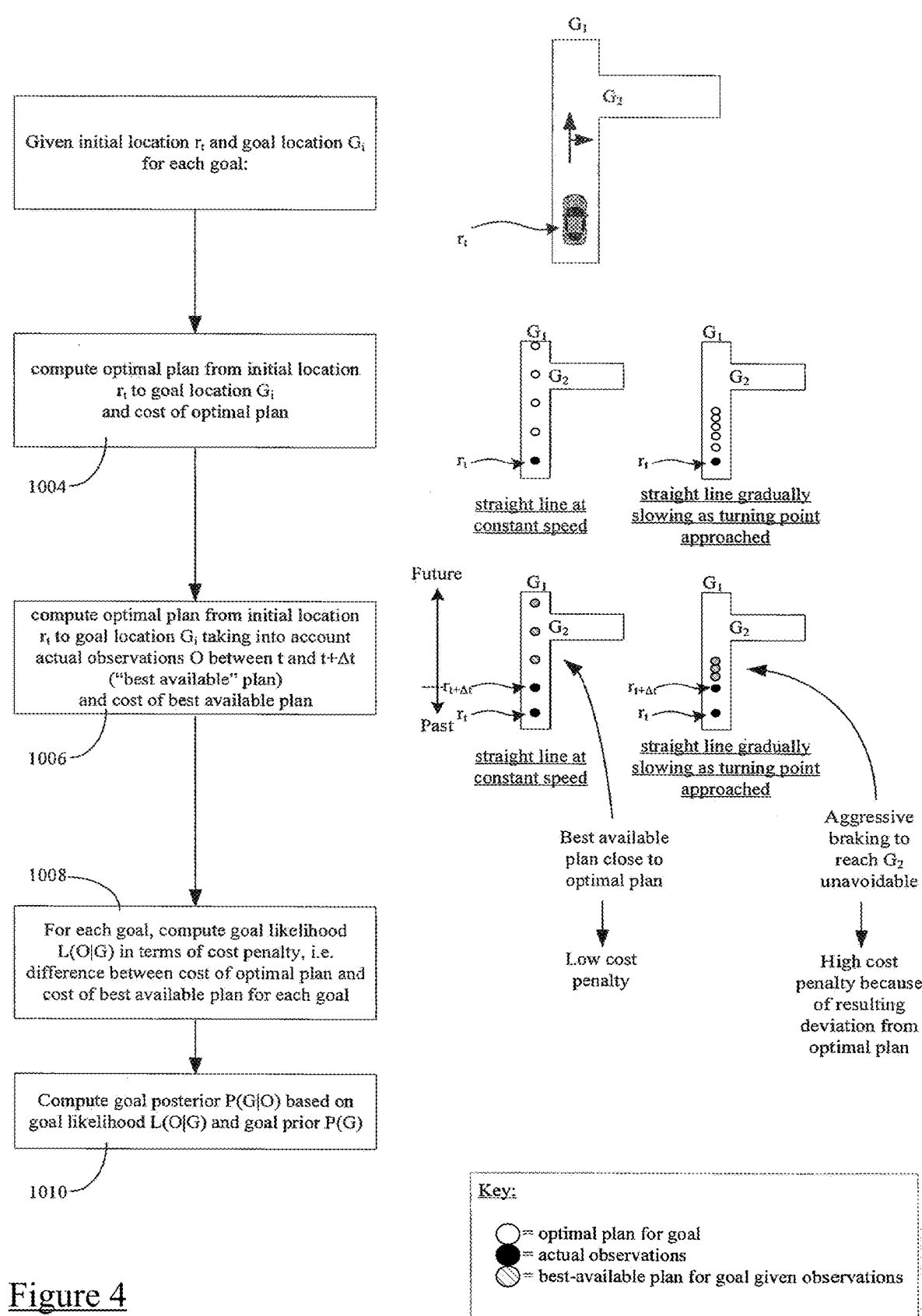
FIG. 4 shows a flowchart for an example inverse planning method.

FIG. 4 shows a schematic flowchart for a method of probabilistically inferring a goal of an external actor, from a finite set of available goals, based on cost penalties. The right-hand side of FIG. 4 shows an illustrative example of the steps applied to a scenario with two available goals:

1. $G_1$—continuing along the current road, which is defined as a goal location at the end of the visible road (more generally, as a reference point ahead of the car on the current road);
2. $G_2$—taking a right-turn exist, defined in terms of an exit location.

Given a set of possible goals for an observed car and a sequence of past basic maneuvers executed by the car, a posterior distribution over the goals can be computed using a process of inverse planning. This method computes a Bayesian posterior, $P(G|O)\sim L(O|G)\,P(G)$, over the possible goals G given a sequence of observations O (e.g. an observed trace $\tau_n$, as in the above examples), a prior distribution $P(G)$ over goals, and the likelihood function $L(O|G)$.

The notations $P(O|G)$ and $L(O|G)$ are equivalent and mean the conditional probability of the observations O given the goal G. The notation "L" is used consistent with the fact that these probabilities are likelihoods in the statistical sense (note that, earlier in this disclosure, the term likelihood is used in the every-day sense and not necessarily this specific statistical. The meaning will be clear in context).

A goal is defined in terms of a goal location, and the notation $G_i$ may be used to represent the goal location for that region. The goal location $G_i$ can be a point in space, but can also be region or could correspond to a particular distance along the road, e.g. a goal location could be defined as a line perpendicular to the road and in that case the car is said to have reached the goal once it reaches that line (irrespective of its lateral position in the road).

The likelihood $L(O|G_i)$ for a given goal $G_i\in G$ is defined as the difference between the respective costs of two plans (the cost penalty):

1. an optimal plan from the car's initial location $r_t$ (at time t) to the goal location $G_i$, i.e. the optimal plan to get from $r_t$ to $G_i$ irrespective of any observed behaviour of the car after time t. This could be executed as a basic maneuver, a macro action or a sequence of multiple basic maneuvers other than a macro action. With multiple basic manoeuvres, the partial trajectories associated therewith are combined to provide an optimal full trajectory for reaching the goal $G_i$ from the initial position $r_t$ (irrespective of any actual observed behaviour of the car after time t); and
2. a "best available" plan—this is defined as an optimal plan from $r_t$ to the goal location $G_i$ given any observed behaviour of the car between time t and time $t+\Delta t$, i.e. the best plan to get from $r_t$ to $G_i$ with the additional constraint that this plan must match the behaviour actually observed in the subsequent time interval $\Delta T$. In other words, as the optimal plan from the car's initial location $r_t$ to goal $G_i$ such that the plan respects the observations O. This assumes that cars are more likely to execute optimal plans to achieve goals but allows for a degree of deviation. This could also be executed as a basic maneuver, a macro action or a sequence of multiple basic manoeuvres other than a macro action. With multiple basic manoeuvres, the partial trajectories associated therewith are combined to provide a "best available" full trajectory for reaching the goal $G_i$ from the initial position $r_t$ but taking into account the actual observed behaviour of the car in the interval from t to $t+\Delta t$. The best available trajectory has an observed portion for the interval $[t, t+\Delta t]$ which matches the actual observed trajectory and a future portion for a subsequent time interval, chosen so as to minimize an overall cost associated with best available full trajectory (i.e. the full cost of both the observed portion and the future portion).

This is a form of goal recognition because it considers the full path to reach the goal (which may be based on multiple partial trajectories associated with multiple maneuvers).

The cost assigned to a full trajectory can take into account various factors as described later. These include driving time (penalizing trajectories that take longer to reach a goal), safety (penalizing unsafe trajectories) and comfort (e.g. penalizing trajectories with excessive jerk).

The car's initial location $r_t$ may for example be the first observed location of the car. A reasonable approach is to use a moving window of past observations defined by the ego car's sensor ranges to define the initial location $r_t$.

An optimal plan (1 above) is computed for each goal $G_1$, $G_2$ at step 1004 in FIG. 4. Once computed, this allows an optimal trajectory to be determined for each goal $G_1$, $G_2$, for example, using an A* search (see below for details). Having computed the optimal trajectory, a full cost associated with the optimal trajectory can then be computed (also described below). The optimal trajectory is a full trajectory, i.e. for reaching the goal in question from the initial location $r_t$.

In the example of FIG. 4, trajectories are denoted by points along the trajectory that are evenly spaced in time, such that evenly-spaced points imply constant velocity and increasing (resp. decreasing) distance between points implies acceleration (resp. deceleration). White circles are used to represent optimal trajectory points. It can thus be seen that, for goal $G_1$, the optimal trajectory is a straight-line path continuing along the road at constant speed, whereas for goal $G_2$ the optimal trajectory gradually slows as the car approaches a turning point for the exit.

A best available plan (2 above) is computed for each goal $G_1$, $G_2$ at step 1006. As indicated, these take into account actual observations O between time t (when the car was at its initial location $r_t$) and a current time $t+\Delta t$. Those observations O may comprise the observed low-level trace $\tau$, represented in FIG. 4 using black circles.

In that context, the observations O may alternatively or additionally comprise a current maneuver of the car, i.e. the probability of each goal may estimate in dependence on a maneuver currently being executed by the car. They may additionally include past observed maneuvers.

Although not shown explicitly in FIG. 4, as described above, probabilistic maneuver detection is applied to predict a probability distribution over possible current maneuvers for the car. Hence, the current maneuver may not be known definitely but only probabilistically, in terms of a distribution $p(M|\tau)$ over possible current manoeuvres. This can be addressed by first sampling a current maneuver $M_j$ from $p(M|\tau)$ and then sampling from the goal probability distribution $p(G|O)$ for that current maneuver $M_j$ (i.e. with the observations O comprising $M_j$).

From the best available plan, a best available trajectory can be determined (see below for details), which in turn allows a full cost to be determined for the best available trajectory (also described below). This is also a full trajectory in the sense of being a complete trajectory from the initial location $r_t$ to the goal location $G_i$. The best available trajectory has an observed portion between time t and $t+\Delta t$ that matches the actual observed trajectory (i.e. the black circles in FIG. 4) and additionally includes a future portion for the time after t+ΔT, represented in FIG. 4 using diagonally shaded circles.

In the depicted example, it can be seen that both the observed portion (black circles) and the future portion (diagonally shaded circles) of the best available trajectory for goal $G_1$ match the optimal trajectory (white circles) for that goal $G_1$ reasonably well. Therefore, the cost penalty for goal $G_1$—being the difference between the cost of the optimal trajectory and the cost of the best available trajectory—is relatively low.

However, for goal $G_2$, the observed trajectory (black circles) deviates from the optimal trajectory (white circles) fairly significantly, because the car has failed to by time t+Δt to the extent required by the optimal trajectory. This discrepancy will not necessarily cause a significant cost penalty per se (it may or may not depending on the details of the implementation). However, as a consequence of the observed behaviour, it can be seen that the future portion of the best available trajectory (i.e. the potion after time t+Δt) must necessarily include sharp braking (which reflects the fact that the lowest-cost path from the car's current location to $G_2$ must involve sharp braking given the circumstances of the car)—which is penalized by the cost function. This discrepancy from the cost of the optimal trajectory means a higher cost penalty for the goal $G_2$.

At step 1008, for each goal $G_1$, $G_2$, the goal likelihood L(O|G) is computed in terms of the cost penalty, i.e. difference between cost of optimal plan computed at step 1004 and cost of best available plan computed at step 1006 for that goal. This, in turn, allows the goal posterior P(G|O) to be computed (step 1010) based on the goal likelihood and the goal prior.

The prior P(G) can be used to encode knowledge about the "inherent" probability of certain goals. For example, it may be observed, in the scenario of FIG. 4, that cars take the right-turn exist relatively infrequently, which could be encoded as a prior with $P(G_2)<P(G_1)$.

This would effectively bias goal $G_1$ in favour of $G_2$. For scenarios without this prior knowledge, each goal could simply be assumed to be equally probable absent any observations of a specific car's individual behaviour, i.e. $P(G_1)=P(G_2)$.

The above assumes that, given a goal, an optimal plan for that goal can be determined given the car's initial location $r_t$, and a best available plan for that goal can be determined given the observations in the subsequent time interval ΔT. It moreover assumes that, given an optimal (resp. best available) plan, an optimal (resp. best available) trajectory can be determined. One mechanism for mapping goals to plans to trajectories in this manner uses an A* search, as will now be described.

Probabilistic Plan Recognition Algorithm

A* Search

An "A* search" is performed over open-loop maneuvers including macro actions. Maneuvers are filtered based on their applicability conditions. If basic maneuvers specify distributions over trajectories, a suitable single trajectory can be selected, e.g. as the mode or most likely trajectory.

An A* search is a known method formulated in terms of a weighted graph of nodes and edges. In the present context, it aims to find an optimal plan for reaching a specified goal $G_i$ from a given location (represented by a starting node). Nodes of the graph represent maneuvers (basic maneuvers or macro actions), and the aim is to find a sequence of nodes (and therefore a sequence maneuvers) which reach the goal at relatively low cost. For each node n, a "cost so far" g(n)

is defined as a cost from the starting node to the node n and a heuristic function h(n) provides an estimate of the cost from n to the goal. The search begins at the starting node and, at each node, extends the sequence to the next node having the lowest node cost defined as:

$$f(n) = g(n) + h(n).$$

A simplifying assumption may be used that all other cars in the environment use a constant-velocity model.

For the purpose of finding the optimal trajectory from the initial location $r_t$ to the goal $G_i$, the search begins with the maneuver being by the car executed at time t and the location $r_t$. For the purpose of finding the best available trajectory from the current position $r_{t+\Delta t}$ of the car to the goal given the observations O in the time interval Δt, the search begins with the detected current manoeuvre and the current position $r_{t+\Delta t}$.

The above-described maneuver detection method can be used to detect maneuvers. Note that this will generally result in a probability distribution over possible current maneuvers. The inverse planning should be done for every predicted current maneuver, as these may lead to different posteriors over goals. Thus, each possible current maneuver produces its own goal posterior. For computational efficiency, only the n-most likely current maneuvers are considered and any other maneuvers are ignored, where n is a method parameter that can be set appropriately.

The cost so far g(n) to reach a current location (current search node) can be defined as an estimated driving time to the current location based on paths and velocities specified by basic maneuvers.

The cost heuristic h(n) to estimate remaining cost to goal is given by the driving time from current location to goal location via straight line at speed limit. Note, in order to guide the search effectively, h(n) only needs to provide an estimate of the minimum remaining cost in order to guide the search. Hence, relatively coarse assumptions can be made here without impacting performance.

After finding an optimal plan, a complete trajectory is generated across maneuvers in the plan. Velocity smoothing is then applied to the complete trajectory and the full cost function is computed (see Cost Function section below) to obtain a final cost of the plan. This last step (applying smoothing and full cost function) makes it possible to pick up on additional "clues" based on velocities, as in the braking example below.

Velocity smoothing is not applied to any part of the trajectory that has already been observed. Otherwise, the effect of velocity smoothing could be to wash out evidence that would hint at certain goals (see below for further details in the context of the example of FIG. 4).

To account for cases in which the car is mid-way through a maneuver (e.g. a lane change), the car's currently executed maneuver needs to be recognized so that is can be completed the before planning further into the future.

To reduce the search space, the basic turn and cautious maneuvers may be removed from the search space, since these are not used outside of macro actions. The lane-follow maneuver can still be useful as a basic maneuver outside a macro action, if its terminal condition is set to some fixed length as a default value.

The present examples does not check for collisions between external actors during inverse planning. Although this could be done, it would make the whole process more expensive. Moreover, due to some simplifying assumptions such as constant velocities of other vehicles, there can be situations where collisions happen inevitably. The multi-agent MCTS method detailed below can handle such collision checking.

Alternatively, the process can be extended to reason about possible collisions as part of inverse planning.

The assumptions set out above in relation to the A* search have been found to provide a good balance between computational efficiency and performance. It will of course be appreciated that different sets of assumptions may be used, such as non-constant velocity models. As another example, the above essentially turns the search problem into a deterministic problem, by considering only the most-likely trajectory associated with a maneuver. However, this can equally be extended to a probabilistic search based on full or truncated trajectory distributions. That is to say, whilst the above considers full/partial trajectory models in the form of single trajectories, the techniques can also be applied to full/partial trajectory distributions.

Multi-threading can be used to speed-up the process, by using independent threads for each goal G. With an additional assumption that cars have independent goals, further parallelization can be achieved by using one process/thread for each other car.

Braking

Although braking is not recognised as a distinct maneuver in the above method, the method is still able to account for braking in the likelihood of goals.

As an example, consider the scenario shown in FIG. 4 and described above. The optimal plan to G2 from the initial position of the car is given by the Exit right macro action. After applying velocity smoothing, the result is a trajectory that continually slows down until the car reaches the turning point. The cost of this optimal trajectory is denoted by C2.

Assume the car is observed to follow the lane, now half-way closer to the turning point, and slowing down similarly to the optimal trajectory for G2. Hence, if the trajectory to G2 is competed, this results in a trajectory with a cost similar to C2. On the other hand, the optimal trajectory to G1 from the initial state would not involve such braking, leading to a significant cost difference (due to difference in time and possibly jerk). Thus, the posterior probability of G2 increases while the probability of G1 decreases.

(As an aside: it is noted above that velocity smoothing is not applied to any part of the trajectory which has already been observed. The reasoning behind this is apparent in this example: if velocity smoothing were applied to the entire trajectory, then the smoothing would also reduce velocities in the part of the lane-follow maneuver that was already observed. This would lead to a lower cost penalty because the braking is not quite so sudden anymore. In other words, it would make the trajectory more similar to the optimal trajectory from the initial observed position. Therefore, it is appropriate for the smoothing to treat the past trajectory as unmodifiable constants.)

Now assume the car is instead observed to follow the lane but with a constant velocity instead of slowing down. If this trajectory is continued to G2, it will involve a sudden braking, resulting in a cost much higher than C2. On the other hand, continuing the trajectory to goal G1 (staying in lane) is essentially the optimal plan for G1 from the initial state. Thus, G2 decreases in posterior probability and G1 increases.

Finally, assume the car is observed to follow lane and suddenly slows down close to the turning point. This sudden braking will cause a significant cost penalty for both $G_2$ and $G_1$, because it is not in either optimal trajectory from the initial state. Thus, the cost of both goals would increase, causing a smaller change in the relative probability of the two goals.

Predicting Trajectories from Goals

To predict a car's possible trajectories and associated probabilities to a given goal, the same A* search method can be used as used for inverse planning. Rather than terminating A* after it finds the optimal plan, a fixed time budget is imposed instead and the algorithm is permitted to compute a set of plans with associated costs (possibly up to some fixed number of plans). Any time A* search finds a node that reaches the goal, the corresponding plan is added to the set of plans. Trajectories are generated from the plans by connecting the partial trajectories given by the maneuvers in the plan.

A distribution over trajectories extracted from the plans can be computed using a softmax distribution (trajectory model):

$$P\left(T^{(n)}\right) = \frac{\exp(-C_n\beta_n)}{\sum_m \exp(-C_m\beta_m)}$$

where $T^{(n)}$ is the n-th full trajectory to the goal, $C_m$ is the cost of the trajectory (full cost after smoothing), and $\beta_n$ is a scaling factor for the trajectory $T^{(n)}$ (as noted above, the notation $T^{(n)}$ is used for the n-th full trajectory to the goal to distinguish from a partial trajectory $T_j$ for a given maneuver $M_j$). This encodes the assumption that trajectories which are closer to optimal are more likely. The scaling factor could be used to down-weigh specific trajectories based on observed data, i.e. to allow the trajectory prediction model to be trained on relevant examples. Alternatively, a constant scaling factor (e.g. value of 1) could be used.

The above softmax trajectory model can be used as an alternative to the trajectory model obtained via RRT.

As in inverse planning, a set of such trajectories is produced for each predicted current maneuver, focusing on some subset such as the n-most-likely current maneuvers. A* starts after completing the current maneuver, and the final trajectories include the rest of the current maneuver.

This predicts various plausible trajectories rather than a single optimal trajectory, which is beneficial because there are situations in which multiple trajectories achieve (near-) minimal cost but lead to different predictions which in turn may require different behaviour on the part of the ego vehicle.

At the hardware level, the on-board computer system A1 of the AV comprises execution hardware capable of executing algorithms to carry out the above functions. Whilst the execution hardware can be general purpose or special purpose execution hardware, or any combination thereof, it will generally comprise one or more processors such as central processing units (CPUs) and which may operate in conjunction with specialized hardware such as, but not limited to, accelerators (e.g. GPU(s)), field programmable gate-arrays (FPGAs) or other programmable hardware, and/or application-specific integrated circuits (ASICs) etc. Given the need to perform complex data processing operations, often using sophisticated and complex ML/AI models, with sufficient accuracy and speed (often in real-time) to ensure safe and reliable operation, the on-board computer system may be highly sophisticated, possibly with specialized computer hardware tailored to implement the models and algorithms in question. Particularly given the speed at which innovation is progressing in the field of AI, it will be appreciated that the architecture of the AV on-board computer system A1 at both the hardware level and the functional/software level may take numerous forms. Herein, functional components and the like embodied in a computer system—such as the data processing component A2, prediction component A4 and AV planner A6—are high-level representation of particular functionality implemented by the computer system, i.e. functions performed by whatever (combination of) general purpose and/or specialized hardware of the computer system that is appropriate in the circumstances.

The invention claimed is:

1. A computer-implemented method of probabilistically predicting a target location of an external actor, the method comprising:

receiving, at a computer, sensor inputs for detecting and tracking the external actor;

applying object tracking to the sensor inputs, in order to track the external actor, and thereby determine an observed trace of the external actor over a time interval from a first time to a third time;

determining based on a map a set of available target locations for the external actor;

for each target location of the set of available target locations, generating a respective first trajectory model over said time interval from the first time to the third time, based on a location of the external actor at the first time, and the respective target location on the map, wherein each first trajectory model includes one or more first trajectories from the location of the external actor at the first time to the respective target location;

for each target location, determining, a likelihood that the external actor is attempting to reach the respective target location based on (1) the first trajectory model for the respective target location and (2) an observed trace of the external actor between the first time and a second time, wherein the second time is between the first time and the third time; and generating one or more control signals based on the determined likelihood, and providing the one or more control signals to a drive mechanism of an autonomous vehicle.

2. The method of claim 1, implemented in the autonomous vehicle, wherein a planner of the autonomous vehicle makes an autonomous driving decision in dependence on the likelihood that the external actor is attempting to reach at least one target location of the set of available target locations and on the sensor inputs obtained using a sensor system of the autonomous vehicle, and wherein the generating of the one or more control signals is further based on the autonomous driving decision.

3. The method of claim 1, wherein the one or more first trajectories of the first trajectory model for each target location include:

a single predicted trajectory associated with the respective target location, or a distribution of predicted trajectories associated with the respective target location.

4. The method of claim 1, wherein for each target location, generating the first trajectory model includes:

executing a generative behaviour model for the respective target location, the generative behaviour model having been trained to generate trajectories based on examples of real-world driving behaviour.

5. The method of claim 1, wherein each first trajectory model is determined based on one or more ego vehicle parameters to model a response of the external actor to ego vehicle behaviour.

6. The method of claim 1, further comprising generating a second trajectory model for the respective target location based on the observed trace of the external actor between the first time and the second time, wherein the determining the likelihood is based on the second trajectory model.

7. The method of claim 6, wherein generating the second trajectory model for the respective target location includes:

determining a sequence of possible manoeuvres the external actor to reach the respective target location, wherein the possible manoeuvers are associated, respectively, with partial trajectory models;

wherein the second trajectory model for the respective target location is generated based on the partial trajectory models associated with the possible manoeuvres.

8. The method of claim 7, wherein each partial trajectory model of the partial trajectory models comprises one or more target motion values, and wherein generating the second trajectory model for the respective target location comprises applying motion smoothing to the one or more target motion values of the partial trajectory models to determine one or more motion values of a portion of the second trajectory model.

9. The method of claim 6, wherein determining the likelihood that the external actor is attempting to reach the respective target location includes:

applying a cost function to both the first trajectory model for the respective target location and the second trajectory model for the respective target location, to determine a first cost associated with the first trajectory model and a second cost associated with the second trajectory model; and comparing the first cost and the second cost.

10. The method of claim 1, further comprising determining at least one predicted trajectory for the external actor after the third time for at least one target location of the set of available target locations; and predicting a probability of the at least one predicted trajectory based on the likelihood that the external actor is attempting to reach the at least one target location.

11. A computer system for probabilistically predicting a target location of an external actor, the computer system comprising:

one or more processors; and memory coupled to the one or more processors, the memory embodying computer-readable instructions, which, when executed on the one or more processors, cause the one or more processors to perform operations including:

receiving sensor inputs for detecting and tracking the external actor;

applying object tracking to the sensor inputs, in order to track the external actor, and thereby determine an observed trace of the external actor over a time interval from a first time to a third time;

determining based on a map a set of available target locations for the external actor;

for each target location of the set of available target locations, generating a respective first trajectory model over said time interval from the first time to the third time, based on a location of the external actor at the first time, and the respective target location on the map, wherein each first trajectory model includes one or more first trajectories from the location of the external actor at the first time to the respective target location;

for each target location, determining a likelihood that the external actor is attempting to reach the respective target location based on (1) the first trajectory model for the respective target location and (2) an observed trace of the external actor between the first time and a second time, wherein the second time is between the first time and the third time; and generating one or more control signals based on the determined likelihood, and providing the one or more control signals to a drive mechanism of an autonomous vehicle.

12. The computer system of claim 11, wherein;

the computer system is an autonomous vehicle computer system;

the receiving the sensor inputs, the applying the object tracking, the determining the set of available target locations, the generating the generating the respective first trajectory model for each target location, and the determining the likelihood are performed by a prediction component; and the operations further include making, by a planner, autonomous driving decisions using outputs of the prediction component.

13. The computer system of claim 12, wherein the computer system is configured to be installed on-board the autonomous vehicle, wherein the planner is configured to be coupled to the drive mechanism of the autonomous vehicle, the planner being configured to generate the one or more control signals and provide the one or more control signals to the drive mechanism.

14. A non-transitory computer readable medium embodying computer program instructions, the computer program instructions configured so as, when executed on one or more hardware processors, to implement operations comprising:

receiving, at a computer, sensor inputs for detecting and tracking an external actor;

applying object tracking to the sensor inputs, in order to track the external actor, and thereby determine an observed trace of the external actor over a time interval from a first time to a third time;

determining based on a map a set of available target locations for the external actor;

for each target location of the set of available target locations, generating a respective first trajectory model over said time interval from the first time to the third time, based on a location of the external actor at the first time, and the respective target location on the map;

for each target location, determining a likelihood that the external actor is attempting to reach the respective target location based on (1) the first trajectory model for the respective target location and (2) an observed trace of the external actor between the first time and a second time, wherein the second time is between the first time and the third time; and generating one or more control signals based on the determined likelihood, and providing the one or more control signals to a drive mechanism of an autonomous vehicle.

15. The method of claim 1, wherein for each target location, generating the first trajectory model for the respective target location includes:

applying a sampling algorithm to sample a space of predicted trajectories defined for the respective target location based on one or more parameters of the respective target location and one or more parameters of the external actor.

* * * * *